United States Patent
Takeuchi et al.

(10) Patent No.: US 6,647,818 B1
(45) Date of Patent: Nov. 18, 2003

(54) GEAR

(75) Inventors: Youichi Takeuchi; Koji Akiyama, both of Kawaguchi (JP)

(73) Assignee: Enplas Corporation, Saitama (JP)

( * ) Notice: Subject to any disclaimer, the term of this patent is extended or adjusted under 35 U.S.C. 154(b) by 0 days.

(21) Appl. No.: 09/437,708

(22) Filed: Nov. 10, 1999

(30) Foreign Application Priority Data

Nov. 12, 1998 (JP) ............................................. 10-322478
Nov. 17, 1998 (JP) ............................................. 10-327195
Feb. 18, 1999 (JP) ............................................. 11-040573

(51) Int. Cl.$^7$ ............................................. F16H 55/14
(52) U.S. Cl. ............................................. 74/411; 74/450
(58) Field of Search ............................. 74/411, 409, 440, 74/450

(56) References Cited

U.S. PATENT DOCUMENTS

| | | | | |
|---|---|---|---|---|
| 4,273,995 A | * | 6/1981 | Devanney | 235/139 R |
| 4,541,296 A | * | 9/1985 | Oyafuso | 74/425 |
| 5,606,890 A | * | 3/1997 | Luckas | 74/411 |
| 6,169,346 B1 | * | 1/2001 | Nakamura et al. | 310/75 D |

* cited by examiner

Primary Examiner—David Fenstermacher
(74) Attorney, Agent, or Firm—Koda & Androlia

(57) ABSTRACT

A gear includes a gear body which includes a rim integral with a plurality of teeth at an outer peripheral surface thereof, and a boss disposed concentrically inside the rim. The gear further includes at least fitting section which is formed from a material having a low hardness and a low flexural strength as compared with a material for forming the gear body, and which is provided between the rim and the boss, so that the gear with a rotational-power transmitting member fitted into the fitting portion is rotated, whereby the rotational power of the gear body is transmitted to the rotational-power transmitting member, while elastically deforming the fitting section to absorb a predetermined amount of a shock produced with the rotation of the gear body. In such gear, the gear body and the fitting section are formed integrally with each other by a two-color molding process. Thus, it is unnecessary to produce a buffering member made of a rubber separately from the gear body and to amount the buffering member to the gear body. Therefore, it is possible to decrease the number of parts and the number of producing steps to reduce the producing cost. In addition, the fitting section cannot be separated from the gear body, leading to an enhanced quality of a gear product.

12 Claims, 18 Drawing Sheets

(a)

(b)

(a)

(b)

(a)

(b)

(a)

(b)

(a)

(b)

(a)

(b)

(a)

(b)

(a)

(b)

(a)

(b)

(a)

(b)

(a)

(b)

GEAR

FIELD OF THE INVENTION

The present invention relates to a gear designed, so that a rotational-power transmitting member can be fitted into a gear body, whereby a power can be transmitted through such member to a desired device, and more particularly, a gear in which a shock force produced at the start and stoppage of the rotation of the gear can be moderated to reduce a noise during rotation of the gear, while reducing the number of parts, the number of operations and the cost which are required for producing the gear.

DESCRIPTION OF THE RELATED ART

This type of the conventional gear is conventionally comprised of a rim integral with a plurality of teeth at an outer peripheral surface thereof, a boss disposed concentrically inside the rim, and a plurality of ribs disposed radiately between the rim and the boss and connected at their opposite ends to the rim and the boss. The rim, the boss and the ribs are integrally formed in the gear, and fitting sections are provided between the boss and the rim, so that the rotational power of a gear body can be transmitted to the disk-shaped rotational-power transmitting member, while a predetermined amount of a shock generated with the rotation of the gear body, by fitting of a disk-shaped rotational-power transmitting member to the fitting sections.

A conventional example of this type of the gear is shown in FIG. 1. The gear body 10 includes teeth 11, a rim 12, a boss, a web 14 and ribs 15. The cylindrical rim 12 is integral with the plurality of teeth 11 at its outer peripheral surface. The boss 13 is disposed concentrically with the rim 12. The rim 14 is connected to the rim 12 and the boss 13. The plurality of ribs 15 extend radiately from the boss 13 toward the rim 12 and is connected to the outer peripheral surface of the boss 13, the inner peripheral surface of the rim 12 and the web 14. The teeth 11, the rim 12, the boss 13 and the web 14 are integrally formed by pouring a molten material comprising a synthetic resin into a mold.

The fitting sections 16 are formed separately from the rim 12, the boss 13, the web 14 and the ribs 15, using a rubber which is soft as compared with the synthetic resin for forming the gear body. The fitting sections 16 are partitioned by the ribs 15; smoothly or tightly inserted in spaces defined in the gear body 10 by the rim 12, the boss 13 and the web 14; and fixed using a fixing means such as a screw which is not shown, or an adhesive.

A notch or recess 16a is defined in each of the fitting sections 16, so that a disk-shaped rotational-power transmitting member can be fitted in the notch or recess 16a.

One example of the disk-shaped power transmitting member is shown in FIG. 2. The disk-shaped power transmitting member 17 has projections 17a provided on one side thereof and each having such a shape that the projections 17a can be fitted into the notches or recessed 16a of the fitting sections 16 mounted to the gear shown in FIG. 1. Thus, the disk-shaped power transmitting member 17 is adapted to be rotated coaxially with the gear by fitting the projections 17a into the notches or recesses 16a.

A shaft 17b is provided on the other side of the disk-shaped power transmitting member 17. The shaft 17b is formed into, for example, a rectangular box-shape as shown in FIG. 2, or as a serration shaft, so that any of various power transmitting members such as various gears and, pulleys can be connected to the shaft 17b.

Thus, when the gear body 10 is rotated, the rotational force thereof is transmitted through the fitting sections 16 to the disk-shaped rotational-power transmitting member 17 to rotate the rotational-power transmitting member 17, and further, the rotational power of the power transmitting member 17 is transmitted to another power transmitting member.

Now, when the rotation of the gear is started, and when the rotation is stopped, an excessive load is applied to the teeth of the gear and the disk-shaped rotational-power transmitting member 17 rotated along with the gear. For this reason, there is a possibility that the meshing of the teeth is degraded, and the loudness of a noise produced during rotation of the gear is increased and in its turn, an adverse affection is exerted to the life of the gear.

Therefore, in the conventional gear of this type, a fitting section 16 made of a rubber separately from the gear body is mounted to the gear body to function as a buffering member for absorbing a shock produced with the rotation of the gear by the elastic deformation of the fitting portion 16, thereby improving the meshing of the teeth of the gear for a period from the start of the rotation of the gear to the stoppage of the rotation to reduce the noise generated during rotation of the gear.

However, when a buffering member made of a rubber separately from a gear body is mounted to the gear body as in the conventional gear, the number of parts are increased correspondingly and moreover, the operation for mounting the buffering member is complicated; the labor required for producing the gear is increased; the efficiency for producing the gear is lowered; and the producing cost is increased. In addition, when buffering member made of the rubber separately from the gear body is mounted to the gear body, there is a possibility that an operator may forget the mounting of the buffering member, and it is difficult to enhance the yield of a product having a good quality. When a buffering member made of a rubber is not mounted to the gear body, and a recess, into which a projection of a disk-shaped rotational-power transmitting member can be fitted, is defined directly in the gear body, an excessive shock produced at the start and stoppage of the rotation of the gear is transmitted, as it is, to the disk-shaped rotational-power transmitting member and the gear body and as a result, the meshing of the teeth of the gear is degraded, and the noise generated with the rotation of the gear cannot be reduced.

SUMMARY OF THE INVENTION

Accordingly, it is an object of the present invention to provide a gear wherein the labor for mounting the buffering member made of the rubber to the gear body can be eliminated, thereby enhancing the efficiency of production of the gear and reducing the producing cost.

To achieve the above object, according to the present invention, there is provided a gear comprising a gear body which includes a rim integral with a plurality of teeth at an outer peripheral surface thereof, and a boss disposed concentrically inside the rim, and at least one fitting section which is formed from a material having a low hardness and a low flexural strength as compared with a material for forming the gear body and which is provided between the rim and the boss, so that the gear with a rotational-power transmitting member fitted into the fitting portion is rotated, whereby the rotational power of the gear body is transmitted to the rotational-power transmitting member, while elastically deforming the fitting section to absorb a predetermined amount of a shock produced with the rotation of the gear body, wherein the gear body and the fitting section are formed integrally with each other by a two-color molding process.

Preferably, the fitting section is formed to fill a space which is comprised of a recess defined by at least the rim, the boss and a web formed between the boss and the rim, and a bore portion communicating with the bottom surface of the recess and defined into such a shape that the sectional area at a predetermined location spaced apart from the bottom surface of the bore portion is larger than the sectional area at a location of connection to the bottom surface of the recess.

Preferably, the bore portion comprises a groove defined in the web on the opposite side from the side in which the recess is defined, and a through-bore having a sectional area smaller than the sectional area of the bottom surface of any of the recess and the groove.

Preferably, the bore portion comprises a through-bore or a groove which communicates with the recess and which is defined into such a tapered shape that the sectional area is increased gradually in a direction from the bottom surface of the recess toward a deeper portion thereof.

Preferably, the side face of the recess is formed into such a tapered shape that the sectional area is increased gradually toward the bottom surface.

Preferably, the gear body is formed from a high-rigid synthetic resin by an injection molding, and the fitting section is formed from a thermoplastic elastomer by an injection molding.

With the gear formed in the above manner according to the present invention, it is unnecessary to produce a buffering member made of a rubber separately from the gear body and to mount the buffering member to the gear body, as in the conventional gear and hence, the number of part and the number of producing steps required for producing the gear can be decreased to reduce the producing cost. In addition, the buffering section cannot be separated from the gear body, leading to an enhanced quality of a gear product.

It is another object of the present invention to provide a gear wherein an excessive shock produced with the rotation of the gear can be absorbed without mounting of a buffering member made of a rubber to the gear body, thereby improving the meshing of teeth of the gear and reducing the noise.

To achieve the above object, according to the present invention, there is provided a gear comprising a gear body which is formed, so that a rotational-power transmitting member is fitted into the gear body to transmit a power through the rotational-power transmitting member, wherein the gear further includes at least one fitting section into which the rotational-power transmitting member can be fitted, and which is formed integrally on the gear body into an elastically deformable shape.

Preferably, the gear body comprises a rim integral with a plurality of teeth at its outer peripheral surface, a boss disposed concentrically inside the rim, and a plurality of ribs disposed radiately between the rim and the boss, and a plurality of the fitting sections are provided in areas partitioned between the boss and the rim by the ribs for fitting the disk-shaped rotational-power transmitting member into the gear body, each of the fitting sections being formed integrally in the gear body into such a shape that it can be elastically deformed along a web formed between the rim and the boss.

Preferably, the fitting section is connected at least at one end thereof to either one of the boss, the rim, the ribs and the web. At least most of that face of the fitting section, which is turned toward the web, is comprised of one or more elastic deformable portion which is formed so that it is not connected to the web.

Preferably, each of the fitting sections is formed, so that a projection provided on the rotational-power transmitting member is damped by the two or more elastic deformable portions.

Preferably, the elastic deformable portion includes an area having a folded shape or an area having a curved shape.

With the gear formed in the above manner according to the present invention, a shock generated with the rotation of the gear can be absorbed by the gear body itself without use of a buffering member made of a rubber used in the conventional gear. Therefore, according to the present invention, it is possible to reduce a noise and an error of meshing of the teeth produced during rotation of the gear to an extent equivalent to or more than that in the conventional gear including the buffering member made of a rubber.

It is a further object of the present invention to provide a gear wherein a rotational power can be transmitted to a power transmitting member connected to the gear, while absorbing an excessive shock generated with the rotation of the gear without mounting of a disk-shaped rotational-power transmitting member and a buffering member made of a rubber to a gear body to improve the meshing of the teeth of the gear and to reduce the noise, thereby reducing the number of parts, the number of operating steps and the producing cost, which are required for producing the gear.

To achieve the above object, according to the present invention, there is provided a gear comprising a rim integral with a plurality of teeth at its outer peripheral surface, a boss disposed concentrically inside the rim, and a plurality of elastically deformable ribs disposed radiately between the rim and the boss, the rim and the boss being connected to each other by the plurality of ribs.

With the gear formed in the above manner according to the present invention, it is possible to remarkably reduce the number of parts, the number of operating steps and the producing cost, which are required for producing the gear, while reducing the noise generated during rotation of the gear to an extent more than that in the conventional gear including the buffering member made of the rubber and the disk-like rotational-power transmitting member.

The above and other objects, features and advantages of the invention will become apparent from the following description of the preferred embodiment taken in conjunction with the accompanying drawings.

BRIEF DESCRIPTION OF THE DRAWINGS

FIG. 1a is a plan view of a conventional gear, and FIG. 1b is a sectional view of the gear taken along a line I—I in FIG. 1a; FIG. 2b is a sectional view of the gear taken along a line II—II in FIG. 2a.

FIG. 3a is a plan view of an embodiment of a gear according to the present invention and included in a first group, and FIG. 3b is a sectional view of the gear shown in FIG. 3a, taken along a line m III—III in FIG. 3a;

FIG. 7a is a plan view of an embodiment of a gear according to the present invention and included in a second group, and FIG. 7b is a sectional view of the gear taken along a line VII—VII in FIG. 7a;

FIG. 8a is a plan view of another embodiment of a gear according to the present invention and included in the second group, and FIG. 8b is a sectional view of the gear taken along a line VIII—VIII in FIG. 8a;

FIG. 9a is a plan view of a further embodiment of a gear according to the present invention and included in the second group, and FIG. 9b is a sectional view of the gear taken along a line IX—IX in FIG. 9a;

FIG. 10a is a plan view of a yet further embodiment of a gear according to the present invention and included in the second group, and FIG. 10b is a sectional view of the gear taken along a line X—X in FIG. 10a;

FIG. 11a is a plan view of a yet further embodiment of a gear according to the present invention and included in the second group, and FIG. 11b is a sectional view of the gear taken along a line XI—XI in FIG. 11a;

FIG. 15a is a plan view of an embodiment of a gear according to the present invention and included in a third group, and FIG. 15b is a sectional view of the gear taken along a line XV—XV in FIG. 15a;

FIG. 19a is a plan view of a further embodiment of a gear according to the present invention and included in the third group, and FIG. 19b is a plan view of a modification to the gear shown in FIG. 19a;

DETAILED DESCRIPTION OF THE PREFERRED EMBODIMENTS

The present invention will now be described by way of embodiments with reference to the accompanying drawings.

FIGS. 3 to 6 show an embodiment of a gear included in a first group of the present invention.

Figure 1:
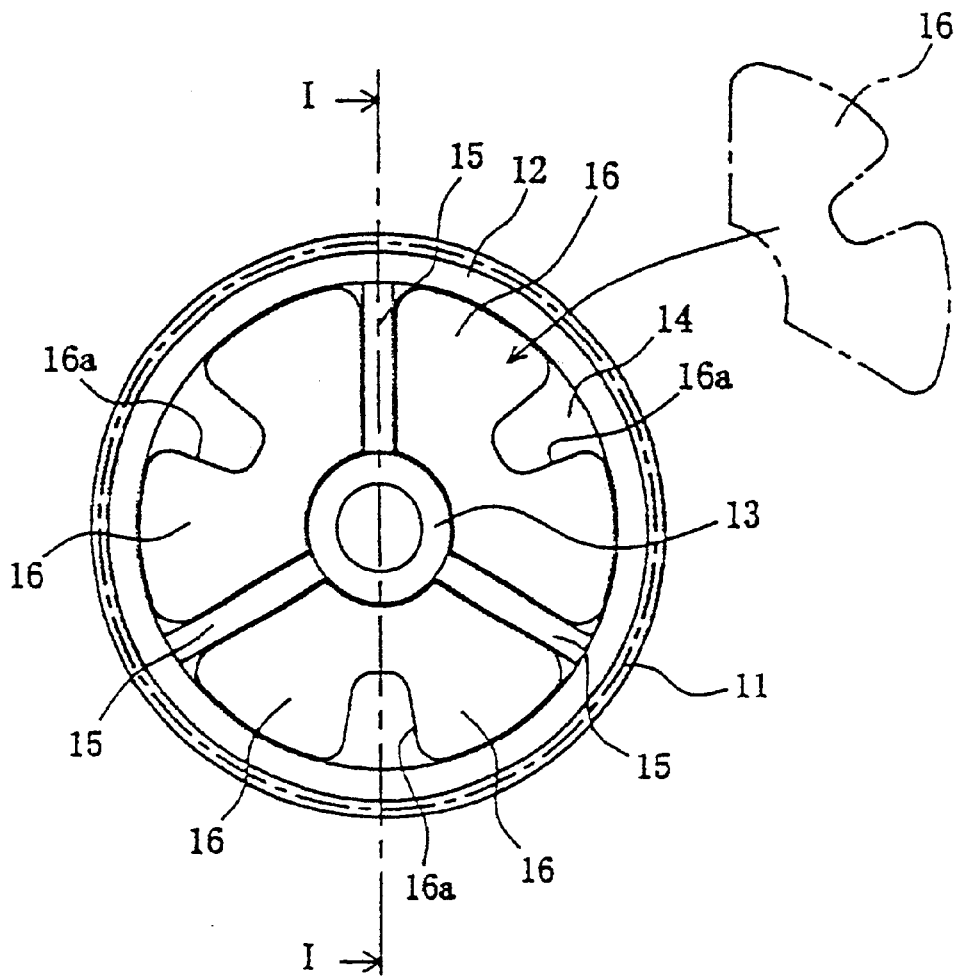
Figure 1:
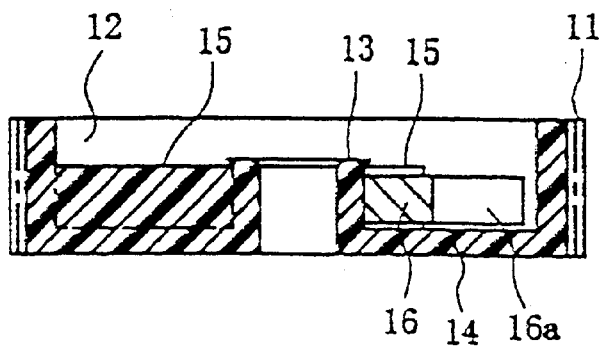

As shown in FIGS. 3a and 1b, the gear of this embodiment includes a cylindrical rim 12 integral with a plurality of teeth 11 on its outer peripheral surface, a boss 13 located concentrically with the rim 12, a web 14 connected to the rim 12 and the boss 13, and a plurality of ribs 15 which extend radiately from the boss 13 toward the rim 12 and which are connected to an outer peripheral surface of the boss 13 and to an inner peripheral surface of the rim and the web 14. The teeth 11, the rim 12, the boss 13 and the web 14 are integrally formed by pouring a molten material comprising a high-rigid synthetic resin such as polyacetal and nylon into a mold, and constitute a gear body 10.

Figure 2:
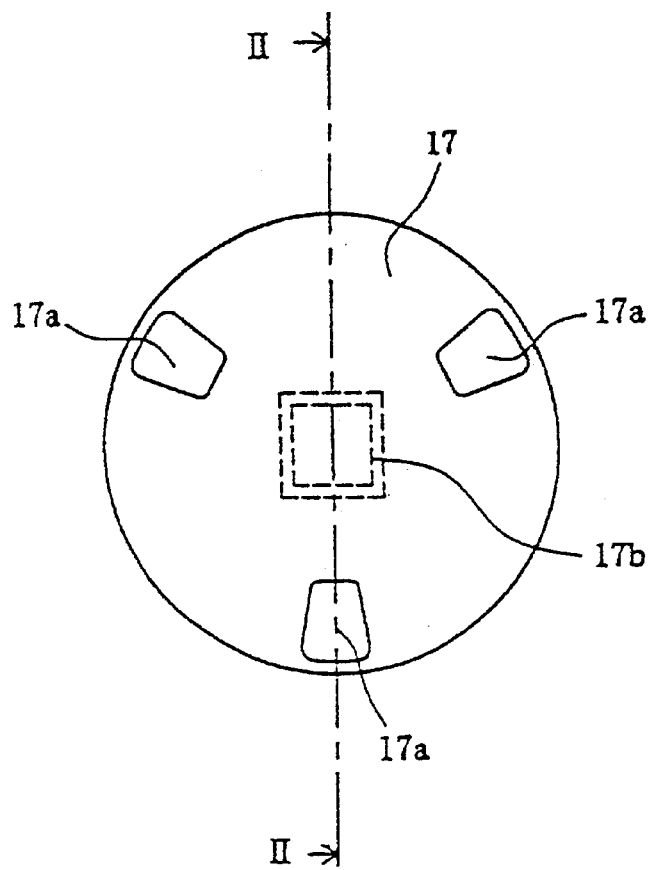
FIG. 2 is a plan view of one example of a disk-shaped rotational-power transmitting member used in the gear.
Figure 2:
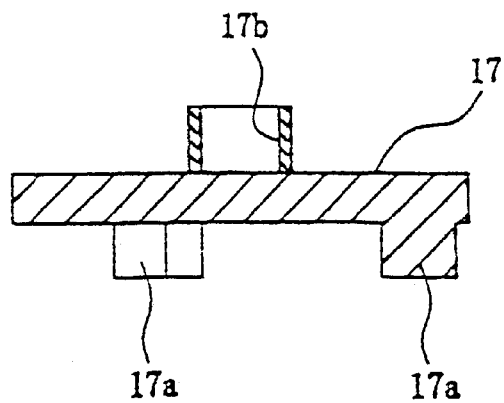

The gear further includes a plurality of fitting sections 16 (but may include a single fitting section 16). Each of the fitting section 16 is formed from an elastic resin having a low hardness and a low flexural strength, as compared with a high-rigid synthetic resin as described above for forming the gear body 10, and having a surface hardness assuming a value in a range of, preferably, 30 to 75 Shore D according to ASTM D2240, more preferably, 40 to 70 Shore D, and a modulus of elasticity in flexure assuming a value in a range of, preferably, 0.05 to 1.0 GPa, more preferably, 0.1 to 0.6 GPa according to ASTM D790. Examples of such resins, which may be utilized, are thermoplastic elastomers such as Hytorel (a trade name) commercially available from Toray/Du Pont, Co., Corp., and Pelplen (a trade name) commercially available from Toyo Bouseki Co., Corp. The fitting sections 16 are partitioned by the ribs 15 and mounted in spaces in the gear body 10 comprised of the rim 12, the boss 13 and the web 14. A notch or a recess 16a is defined at a predetermined location in each of the fitting sections 16, so that for example, a disk-shaped rotational-power transmitting member 17 as shown in FIG. 2 can be fitted into the notch or the recess 16a.

The notch or the recess 16a can be designed into any of various shapes in correspondence to a projection 17a of the disk-shaped power transmitting member 17, if the disk-shaped rotational-power transmitting member 17 can be fitted into and positioned in the gear body 10.

The gear according to the present invention is largely different from the conventional gear in respect of that the fitting sections 16 and the gear body 10 are integrally formed by a two-color molding process into such a shape that they cannot be separated from each other.

In this embodiment, a recess 18 is defined by the rim 12, the boss 13, the web 14 and the rim 15. A groove 19 is defined in the web 14 on the opposite side from the recess 18, and a through-bore 20 is also defined in the web 14 to communicate with the recess 18 and the groove 19, as shown in. FIG. 3b. A bore portion 21 is constituted by the groove 19 and the through-bore 20. The through-bore 20 is defined so that its sectional area is smaller than the sectional areas of bottom surfaces of the recess 18 and the groove 19. The fitting section 16 is formed by filling a molten elastomer into a space 22 constituted by the recess 18 and the bore portion 21 and solidifying the molten elastomer.

Therefore, with the gear of this embodiment, the sectional area of the bottom surface of the groove 19 spaced apart from the bottom surface of the recess 18 is larger than the sectional area of the bore portion 21 in the position of connection to the bottom surface of the recess 18, so that the fitting section 16 cannot be separated from the gear body 10. Thus, it is possible to maintain a state in which the fitting section 16 has been fixed to the gear body 10 without use of a fixing means such as a screw and an adhesive.

Figure 4:
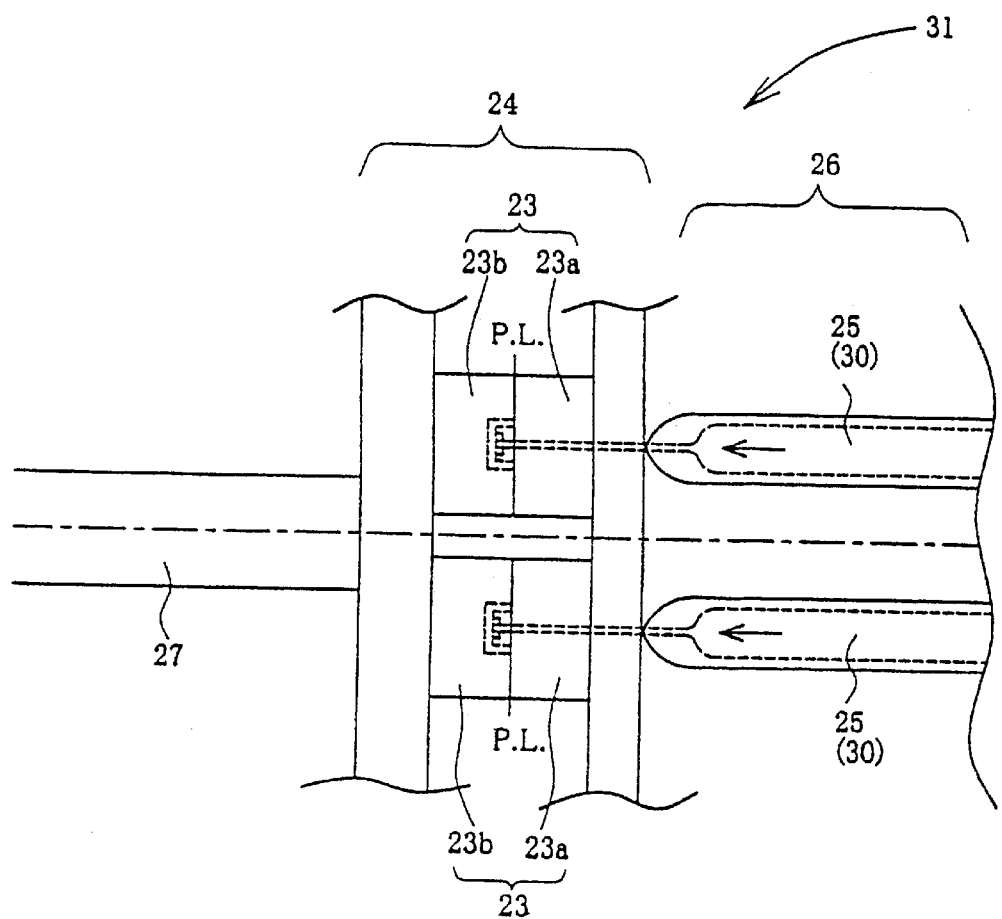
FIG. 4 is a schematic diagram of the arrangement of a molding machine used in the production of the gear according to the present invention.

A molding machine used for producing the gear according to this embodiment by a two-color molding process includes, for example, a mold section 24 having two molds 23, 23, an injecting section 26 having two injecting means 25, 25, and a switching means capable of switching the combinations of the two molds 23, 23 and the two injecting means 25, 25, as shown in FIG. 4.

The die section 24 is mounted to a shaft 27, so that the molds 23, 23 can be rotated about the shaft 27. The molds 23, 23 are located at substantially radially equal distances from the center of the shaft 27.

Each of the molds 23 comprises an upper die 23a and a lower die 23b.

The upper die 23a and the lower die 23b are comprised of movable die members (whose reference characters are omitted), so that they can define a primary molding cavity 28 for producing the gear body 10, as shown in FIG. 5a, and define a secondary molding cavity 29 for producing the fitting section 16 along with the formed gear body 10.

An ejector means (not shown) is provided in the mold 23, and is capable of releasing the gear having the fitting section 16 formed therein from the mold.

Each of the injecting means 25 is comprised of a cylinder 30. The cylinders 30, 30 are adapted to be able to inject a molten high-rigid synthetic resin for use in a primary molding and an elastomer for use in a secondary molding which have been poured thereinto, respectively.

The die members constituting of the molds 23, 23 are designed, so that they can define runners (not shown) such that the predetermined molten materials are injected, when the predetermined cavities are defined.

The switching means comprises a rotatably driving means (not shown) for rotating the shafts 27, 27, so that the combinations of the two molds 23, 23 and the two injecting means 25, 25 can be changed by rotating the shaft 27.

In the molding machine constructed in the above manner, first, the shaft 27 mounted on the mold section 24 is rotated, and the two molds 23, 23 are aligned to positions in which the materials are injected by the two injecting means 25, 25. Then, the upper dies 23a, 23a and the lower dies 23b, 23b of the two molds 23, 23 are closed, and the die members (not shown) constituting the upper dies 23a, 23a and the lower dies 23b, 23b are moved to define the primary molding cavity 28 and the secondary molding cavity 29 corresponding to the two injecting means 25, 25, respectively. Then, the high-rigid synthetic resin and the elastomer are injected into the corresponding two molds 23, 23 by the cylinders 30, 30 of the two injecting means 25, 25 to form and solidify the gear body 10 and the fitting sections 16 simultaneously. Subsequently, the upper dies 23a, 23a and the lower dies 23b, 23b of the two molds 23, 23 are opened, and the gear is released from one of the molds 23 in which the fitting sections 16 have been formed, through the ejector means.

By repeating the above-described steps thereafter, the gears each having the fitting sections 16 integrally formed in the gear body 10 are produced sequentially and continuously.

When the molding machine has been initially operated, the gear body 19 is not formed in any of the two molds 23, 23. For this reason, the elastomer is not injected from the secondary injecting means 25 into the mold 23 aligned to the position corresponding to the injecting means 25 for the secondary molding.

Therefore, with the gear according to this embodiment, a labor for forming the fitting sections 16 separately and inserting them into the gear body 10 can be saved, and the cost required for such labor can be eliminated. In addition, since the fitting sections 16 and the gear body 10 have been formed integrally into an inseparable shape, there is no possibility that the fitting sections 16 are separated off.

Figure 5:
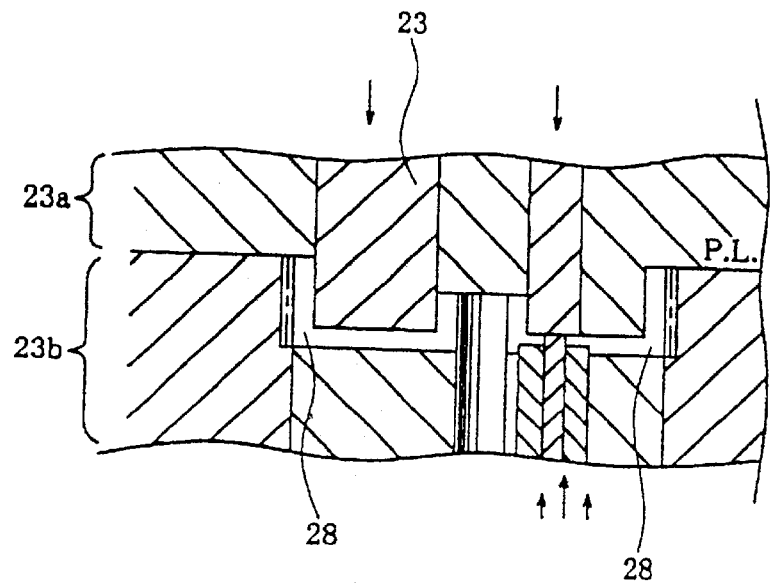
FIGS. 5a and 5b are sectional views of an essential portion of a mold mounted in the molding machine shown in FIG. 4, FIG. 5a showing a state in which a gear body forming cavity has been defined, and FIG. 5b showing a state in which a fitting portion forming cavity has been defined.
Figure 5:
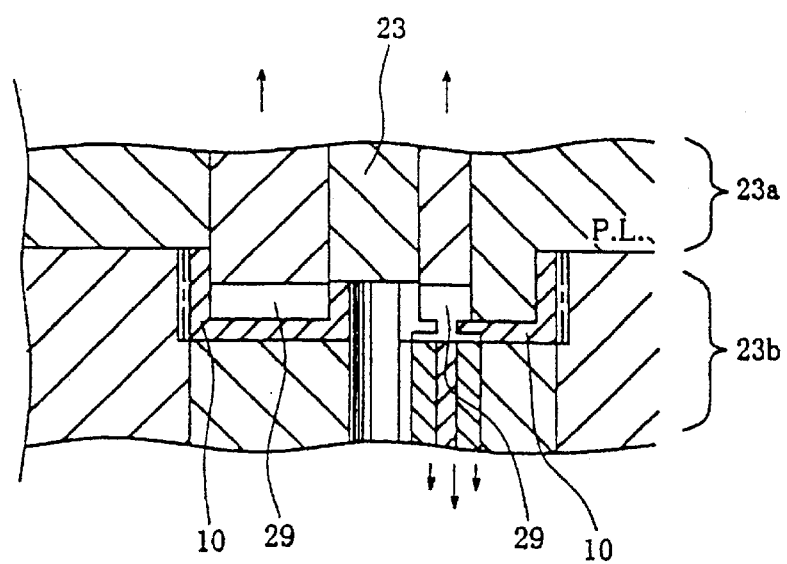

The molding machine used for the formation of the gear according to the present invention is not limited to the construction shown in FIGS. 4 and 5, and for example, may be of a construction in which the upper dies 23a, 23a and the lower dies 23b, 23b shown in FIG. 4 are replaced from each other, and the ejector means are mounted on the upper dies 23a, 23a.

The die members (whose reference characters are omitted) constituting the upper dies 23a, 23a and the lower dies 23b, 23b may be of any construction, if they can define a gear body forming cavity and a fitting section forming cavity.

Figure 6:
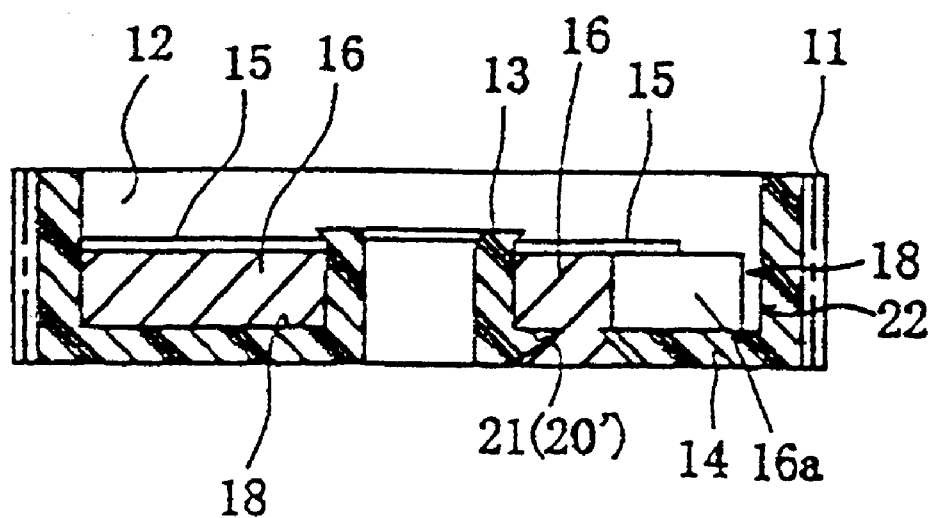
FIG. 6 is a sectional view showing another embodiment of a gear according to the present invention and included in a second group.

FIG. 6 is a sectional view showing another embodiment of a gear according to the present invention.

In the gear of this embodiment, a bore portion 21 defined in a gear body 10 is comprised of a through-bore 20' having a side face which is formed into such a tapered shape that the sectional area is increased from a bottom surface of a recess 18 toward an inner portion, so that fitting sections 16 formed filing a molten elastomer into a space 22 defined by the recess 18 and the bore portion 21 and solidifying the elastomer are separated from the gear body 10. In the case of the gear of this embodiment, the bore portion 21 may be comprised of a groove (not shown) which is completely not passed through a web 14, in place of the through-bore 20'.

Figure 3:
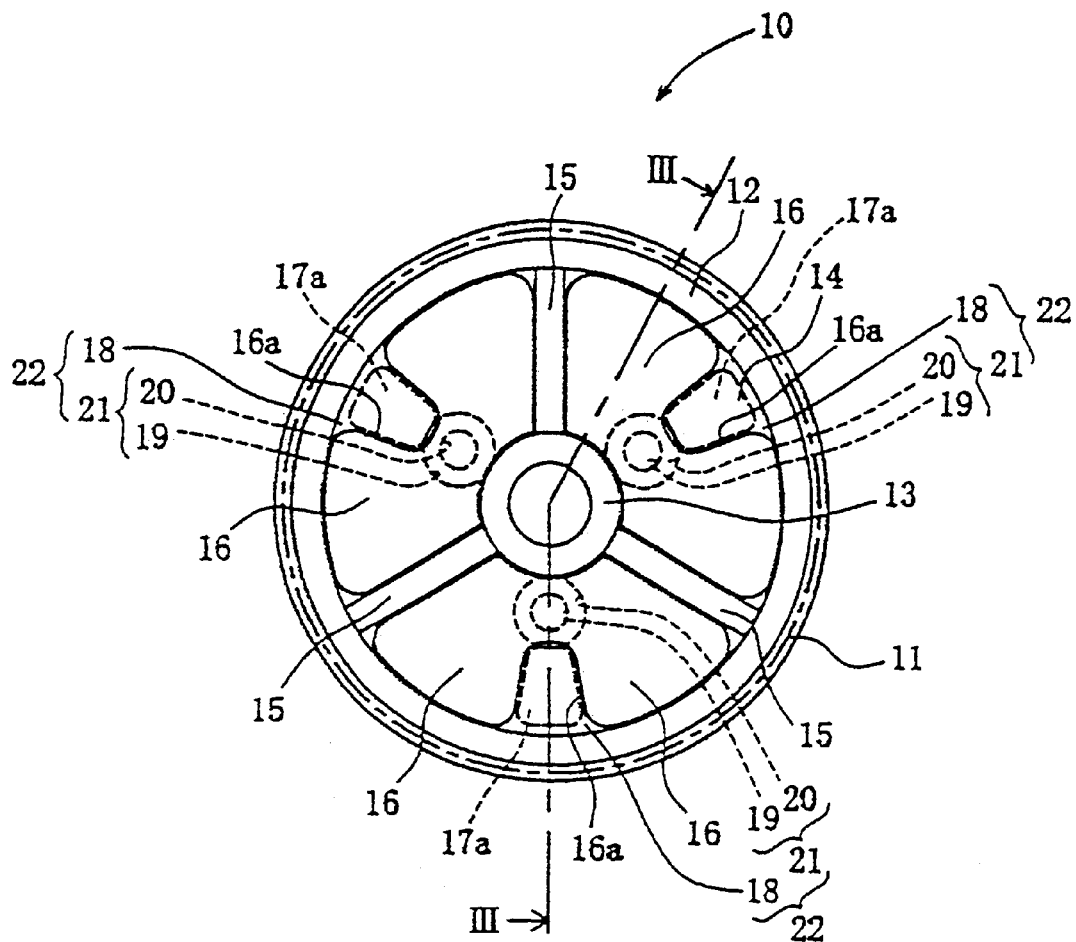
Figure 3:
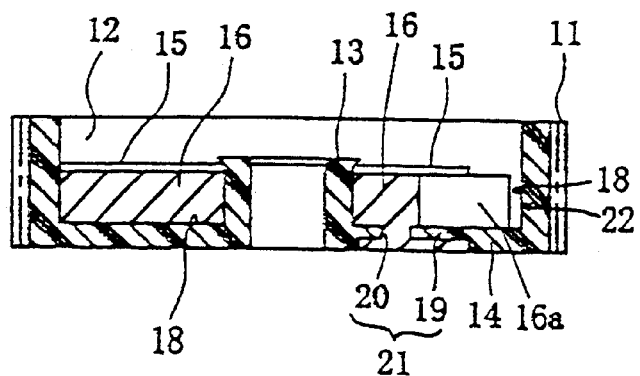

The other construction, function and effect are substantially similar to those of the gear of the embodiment shown in FIG. 3.

The gear of this embodiment can be also formed using a molding machine as shown in FIGS. 4 and 5, as is the gear of the embodiment shown in FIG. 3.

The shapes of the fitting section 16 and the space 22 in the gear according to the present invention are not limited to those shown in each of the embodiments, and may be such that the fitting sections cannot be separated from the gear body.

For example, the side faces of the recess (for example, the inner peripheral surface of a rim 12 and the outer peripheral surface of a boss 13) are formed vertically from the bottom surface, but may be formed into such a tapered shape that the sectional area is increased toward the bottom surface.

In this case, the recess 18 ensures that the fitting sections 16 cannot be separated, and hence, the space 22, into which the elastomer is filled, may be defined without provision of the bore portion 21 in the web 14.

In addition, if required, a reinforcing material, a filler and other additives may be incorporated in a synthetic resin material for forming the gear body and a synthetic resin material for forming the fitting section.

FIGS. 7 to 14 show an embodiment of a gear included in a second group of the present invention.

Figure 7:
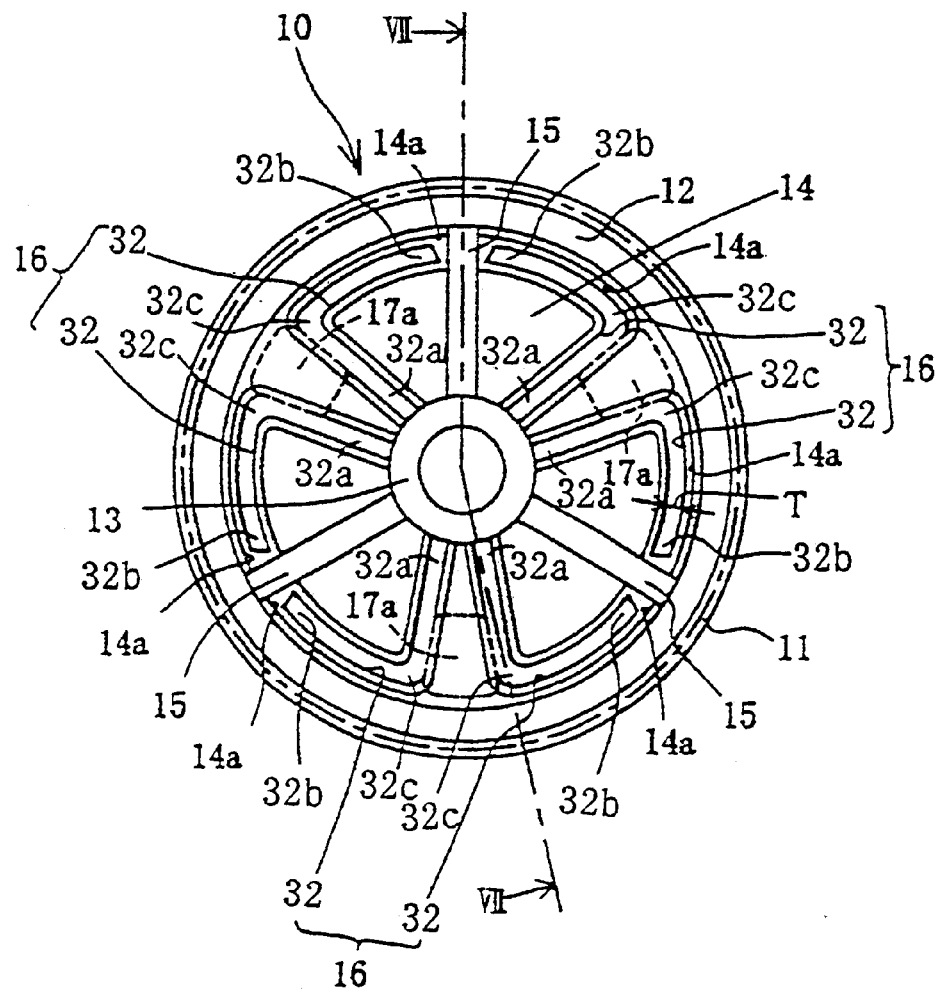
Figure 7:
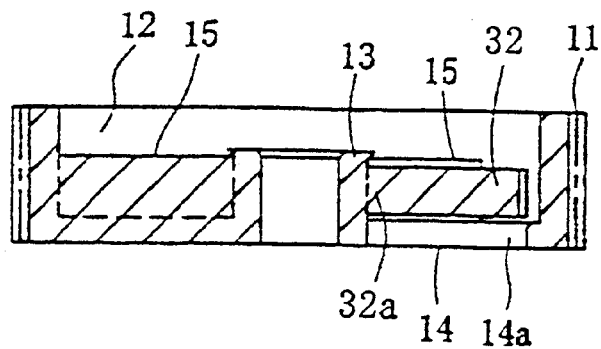

As shown m FIG. 7, the gear of this embodiment includes a cylindrical rim 12 integral at its outer peripheral surface with a plurality of teeth 11, a boss 13 located concentrically with the rim 12, a web 14 connected to the rim 12 and the boss 13, and a plurality of ribs 15 extending radiately from the boss toward the rim 12 and connected to the outer peripheral surface of the boss 13 and the inner peripheral surface of the rim 12 and to the web 14. In this respect, the gear of this embodiment is substantially similar to the conventional gear of this type shown in FIG. 1.

The gear according to the present invention is different largely from the conventional gear in respect of that the fitting section 16 is comprised of elastic deformable portions 32 which are integrally formed in a gear body and liable to be elastically deformed.

In this embodiment, as shown in FIG. 7a, the elastic deformable portion 32 is connected at one end 32a to the boss 13; extends, on the opposite side thereof, along the radius of the gear toward the rim 12; is bent largely in the middle in the vicinity of the inner peripheral surface of the rim 12 to form a bent portion 32c; and further extends toward the ribs 15 in a direction of rotation of the gear. A predetermined distance is left between the other end 32b of the elastic deformable portion 32 and the rib 15. That surface of the elastic deformable portion 32, which is turned toward the web 14, is not connected to the web 14, as shown in FIG. 7b. Therefore, the substantially entire elastic deformable portion 32 is liable to be elastically deformed along the web 14. In order to ensure that the elastic deformable portion 32 is easily formed integrally with the gear body 10 and to ensure that the gear body 10 is easily released from the mold after the primary molding, a groove 14a is defined along the shape of the elastic deformable portion 32, as shown in FIG. 7a. The two elastic deformable portions 32 are disposed in an opposed relation to each other, so that a projection 17a of a disk-shaped rotational-power transmitting member can be fitted and clamped between the two elastic deformable portions 32, thereby forming a fitting section 16.

The fitting section 16 is formed, so that the elastic deformable portion 32 is brought into pressure contact with the projection 17a to fix the rotational-power transmitting member to the gear body 10 in a state in which the disk-shaped rotational-power transmitting member has been fitted into the gear body 10.

In addition, the fitting section 16 is designed in the following manner: the thickness T, the height, the length, the shape, and the degree of elastic deformation and the direction of elastic deformation of the fitting section 16 are determined in consideration of the magnitude of a torque generated by the rotation of the gear, so that when the rotation of the gear with the projections 17a of the disk-shaped rotational-power transmitting members fitted therein is to be started, an area of the elastic deformable portion 32 extending from one end 32a receiving a power in a predetermined rotational direction from the projection 17a to a site of contact with the projection 17a can be elastically deformed to put the other end 32b into abutment against the rib 15, whereby the disk-shaped rotational-power transmitting member can be rotated without deformation of the rib 15, and on the other hand, when the rotation of the gear is to be stopped, the area of the elastic deformable portion 32 extending from the one end 32a receiving the power in the predetermined rotational direction from the projection 17a to the site of contact with the projection 17a can be elastically deformed to put the other end 32b into abutment against the rib 15, and further, an area near the bent portion 32c can be elastically deformed, whereby the rotation of the disk-shaped rotational-power transmitting member can be stopped without deformation of the rib 15.

The gear of this embodiment is formed in the above manner and hence, when the rotation of the gear body 10 having the projections 17a of the disk-shaped rotational-power transmitting members fitted therein is started, one of the elastic deformable portions 32 pushes the projection 17a of the disk-shaped rotational-power transmitting member in the rotational direction and at the same time, receives a predetermined amount of a rotational power in a direction opposite from the rotational direction. At this time, that area of the one elastic deformable portion 32 receiving the predetermined amount of the rotational power in the direction opposite from the rotational direction, which extends from the one end 32a to the side of contact with the projection 17a, is elastically deformed to put the other end 32b into abutment against the rib 15. At this time, a force in the direction opposite from the rotational direction is applied to the rib 16 by the other end 32b, but this force is moderated to such a degree that the rib 15 is not deformed by the deformation of the elastic deformable portion 32. Therefore, when the gear body 10 is rotated, the disk-shaped rotational-power transmitting member is rotated with deformation of the rib 15.

On the other hand, when the rotation of the gear body 10 which is being rotated is stopped, the other elastic deformable portion 32 pushes the projection 17a of the disk-shaped rotational-power transmitting member in the direction opposite from the rotational direction and at the same time, receives a predetermined amount of a rotational power in the rotational direction from the projection 17a. At this time, that area of the other elastic deformable portion 32 receiving the predetermined amount of the rotational power in the rotational direction from the projection 17a, which extends from the one end 32a to the side of contact with the projection 17a, is deformed elastically to put the other end 32b into abutment against the rib 15 and further, the area near the bent portion 32c is deformed elastically. At this time, a force in the rotational direction is applied to the rib 15 by the other end 32b, but this force is moderated to such a degree that the rib 15 is not deformed. Therefore, when the rotation of the gear body 10 is stopped, the rotation of the disk-shaped rotational-power transmitting member is stopped without deformation of the rub 15. The force applied to the elastic deformable portion 32 at the time when the rotation of the gear body 10 is to be stopped, is large and hence, the degree of the elastic deformation of the elastic deformable portion 32 is large, as compared with when the gear body 10 is rotated.

With the gear of this embodiment, an excessive shock generated with the rotation of the gear can be absorbed by the elastic deformable portions 32 constituting the fitting section 16. Therefore, the meshing of teeth of the gear can be improved to reduce a noise during rotation of the gear, as in the conventional gear having the buffering members made of a rubber as the fitting sections 16 separately from the gear body 10 and mounted to the gear body 10. In addition, in the gear of this embodiment, the elastic deformable portions 32 constituting the fitting portion 16 is formed integrally in the gear body 10 and hence, it is unnecessary to mount buffering members made of a rubber to the gear body. Thus, the material cost can be suppressed correspondingly and the gear producing operation can be simplified.

Therefore, with the gear of this embodiment, the material cost and the producing cost can be reduced, the operating burden can be alleviated, while ensuring that the gear has a performance equivalent to or more than that of the conventional gear having the buffering members made of the rubber and mounted therein.

Figure 8:
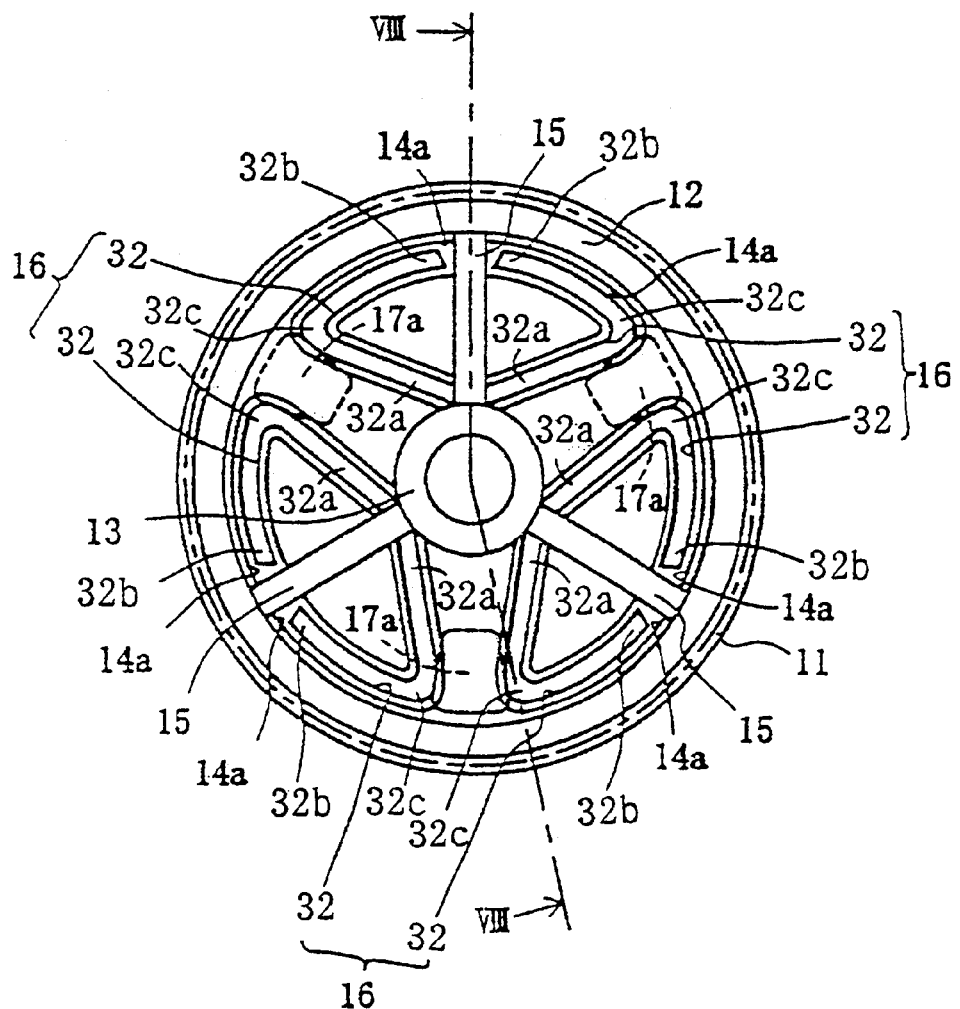
Figure 8:
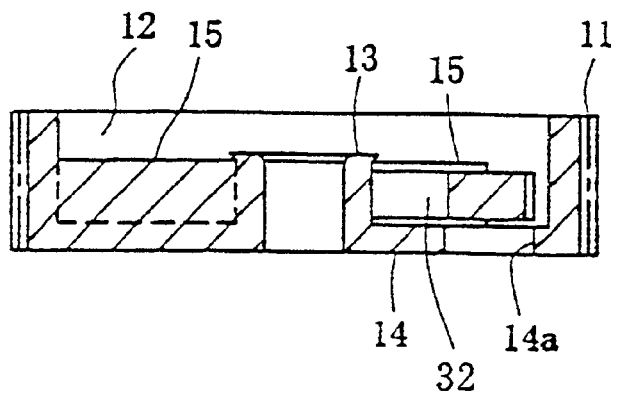

FIG. 8 shows a further embodiment of a gear according to the present invention and included un the second group.

In the gear of this embodiment, an elastic deformable portion 32 is connected at one end 32a to a rib 15; extends, on the opposite side thereof, from the one end 32a toward a projection 17a of a disk-shaped rotational-power transmitting member; and is bent largely at a site of contact with the projection 17a to form a bent portion 3c.

The other construction, function and effect are substantially similar to those of the embodiment shown in FIG. 7.

Figure 9:
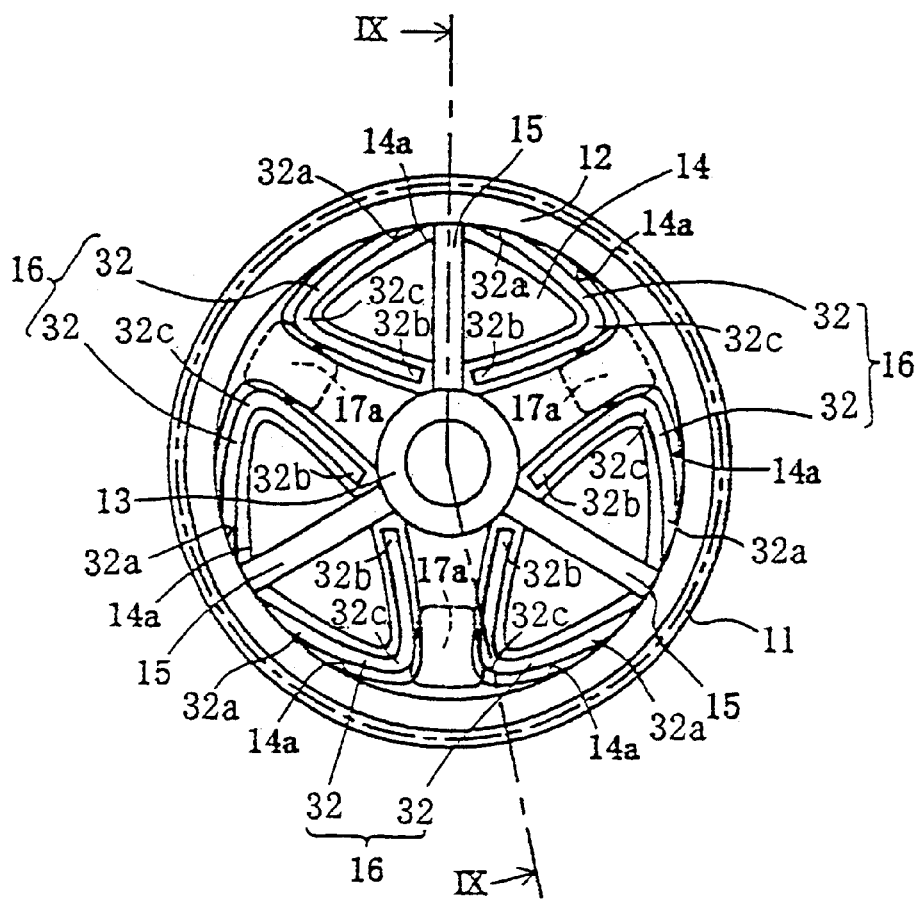
Figure 9:
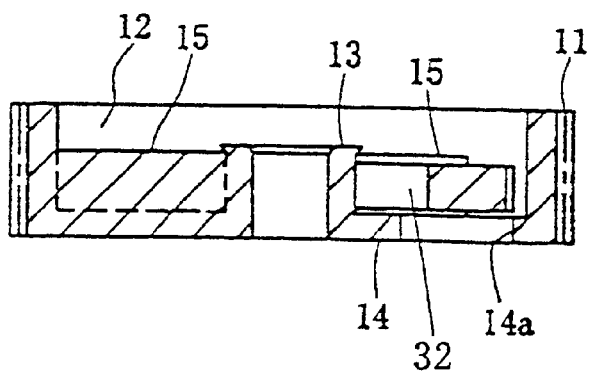

FIG. 9 shows a yet further embodiment of a gear according to the present invention and included in the second group.

In the gear of this embodiment, an elastic deformable portion 32 is connected at one end 32a to a rim 12; extends, on the opposite side thereof, from the one end 32a toward a projection 17a of a disk-shaped rotational-power transmitting member; and is bent largely at a site of contact with the projection 17a to form a bent portion 32c.

The other construction, function and effect are substantially similar to those of the embodiment shown in FIG. 7.

Figure 10:
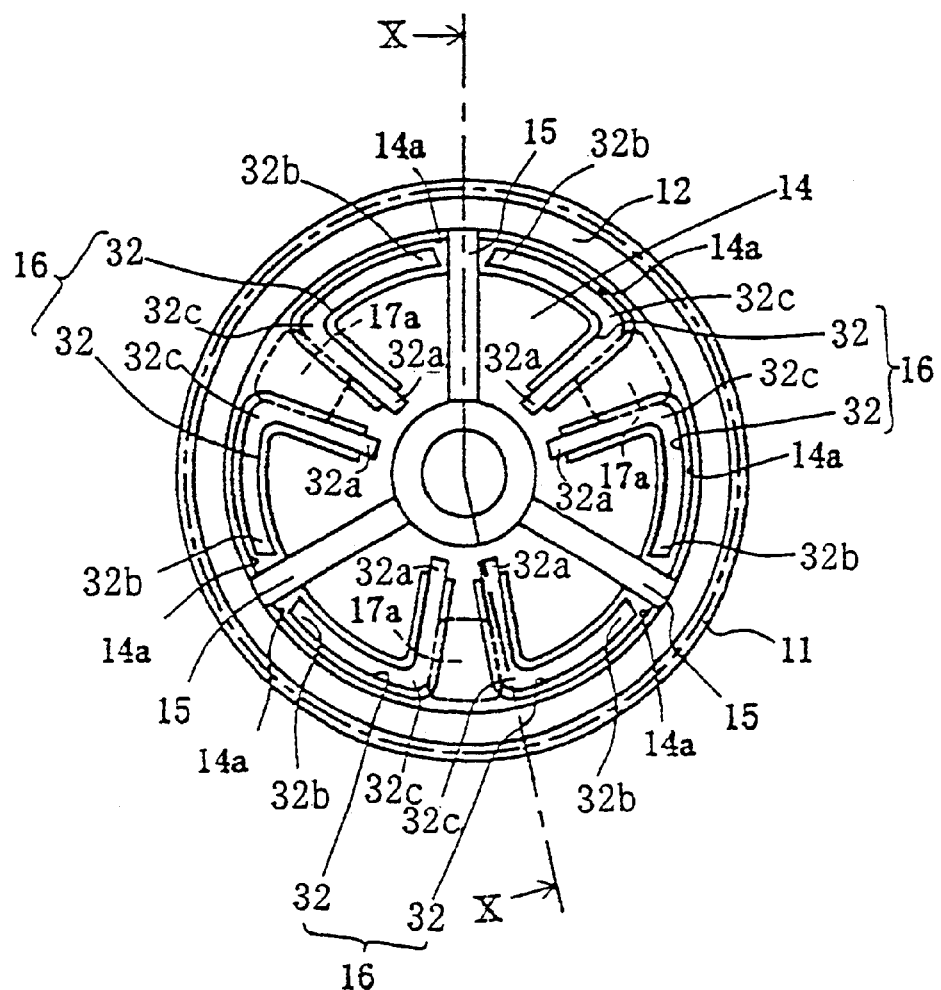
Figure 10:
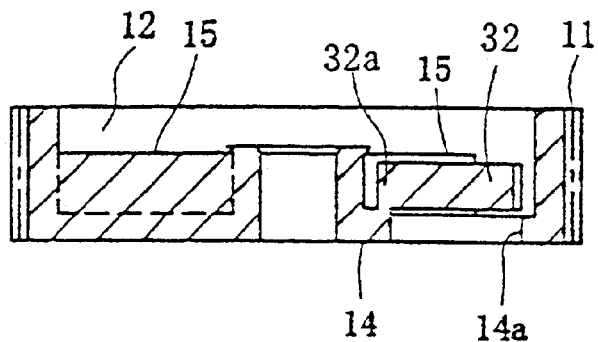

FIG. 10 shows a yet further embodiment of a gear according to the present invention and included in the second group.

In the gear of this embodiment, an elastic deformable portion 32 is connected at one end 32a to a web 14, as shown in FIG. 10b. The elastic deformable portion 32 is not connected to the web except for the one end 32a. For this reason, even in the gear of this embodiment, the elastic deformable portion 32 is liable to be deformed, when it receives a force from a projection 17a of a disk-shaped rotational-power transmitting member.

The other construction, function and effect are substantially similar to those of the embodiment shown in FIG. 7.

Figure 11:
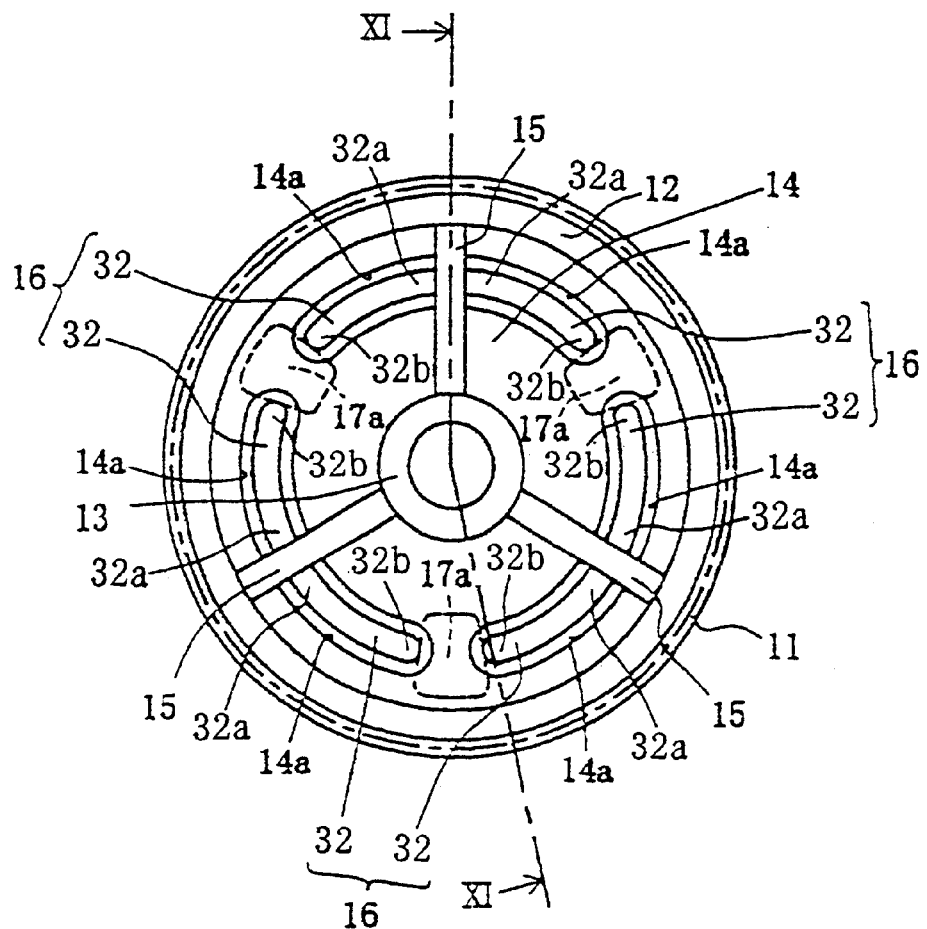
Figure 11:
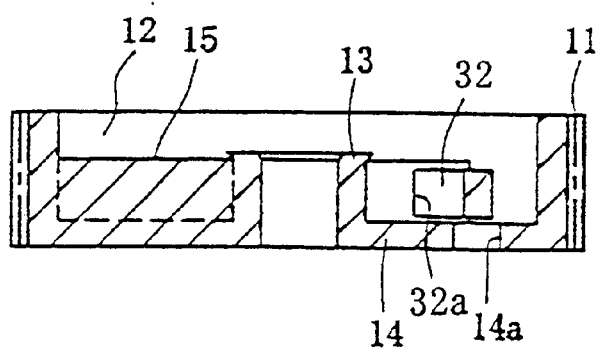

FIG. 11 shows a yet further embodiment of a gear according to the present invention and included in the second group.

In the gear of this embodiment, one end 32a of an elastic deformable portion 32 is connected to a rib 15, and the other end 32b extends in a direction of rotation of the gear, with the end face thereof being formed into a curved shape in such a manner that it abuts against a side face of a projection 17a of a disk-shaped rotational-power transmitting member.

The elastic deformable portion 32 in this embodiment is designed in the following manner: the thickness T, the height, the length, the shape, and the degree of elastic deformation and the direction of elastic deformation of the elastic deformable portion 32 are determined in consideration of the magnitude of a torque generated by the rotation of the gear, so that when the gear with the disk-shaped rotational-power transmitting members fitted therein is to be rotated, the disk-shaped rotational-power transmitting member can be rotated, while the elastic deformable portion 32 receiving a power in a predetermined rotational direction from the projection 17a is being elastically deformed over the substantially entire area without deformation of the rib 15 connected to the one end 32a, and when the rotation of the gear which is being rotated is to be stopped, the elastic deformable portion 32 receiving the predetermined amount of the force in the predetermined rotational direction from the projection 17a can be elastically deformed in an increased amount over the substantially entire area, thereby stopping the rotation of the disk-shaped rotational-power transmitting member.

The other construction, function and effect are substantially similar to those of the embodiment shown in FIG. 7.

In each of the gears of the embodiments shown in FIGS. 7 to 11, the elastic deformable portion 32 is formed so that the other end 32b is not connected to the gear body 10. Alternatively, the other end 32b of, for example, the gear of the embodiment shown in FIG. 8, may be connected to the rib 15 (see FIG. 12), and opposite ends of the elastic deformable member 32 may be connected to the gear body.

Figure 13:
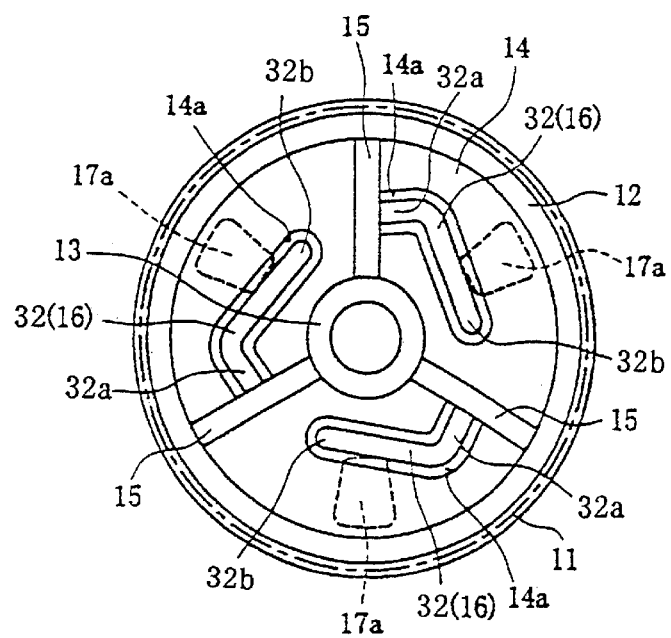
FIG. 13 is a plan view of a further embodiment of a gear according to the present invention and included in the second group.

One fitting section 16 is comprised of the two elastic deformable portions 32 in each of the embodiments, but may be comprised of three or more elastic deformable portions, and the elastic deformable portions constituting the one fitting section may be of different shapes. For example, the shapes of the elastic deformable member receiving a load applied thereto at the start of the rotation and the elastic deformable member receiving a load applied thereto at the stoppage of the rotation may be varied to provide different degrees of absorption of a shock, if they can be rotated only in one direction. If the projection 17a can be positioned to come into pressure contact with the fitting section 16 with the disk-shaped rotational-power transmitting members fitted into the gear body 10, the fitting section 16 may be comprised of a single elastic deformable portion 32, for example, as shown in FIG. 13. The elastic deformable portion 32 shown in FIG. 13 is formed, so that the disk-shaped rotational-power transmitting member can be fixed by bringing the elastic deformable portion 32 into elastic contact with that face of the projection 17a which is turned toward the boss 13.

Figure 12:
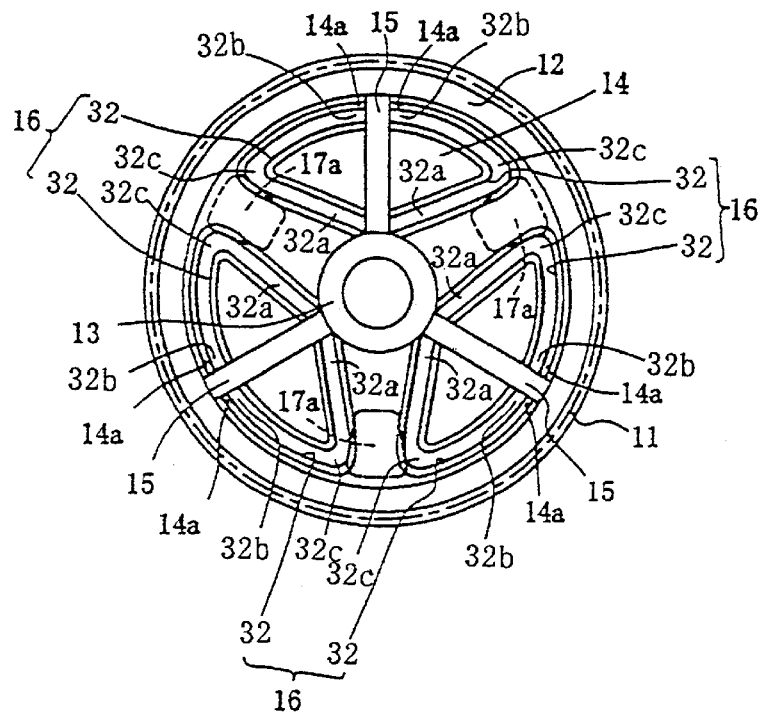
FIG. 12 is a plan view of a yet further embodiment of a gear according to the present invention and included in the second group.

In this case, the elastic deformable portion 32 may be formed, so that the opposite ends are connected to the gear body 10, or so that only one end 32a is connected to the gear body (to the rib 15 in a case shown in FIG. 13) and the other end 32b is not connected to the gear body 10, as shown in FIG. 12.

Figure 14:
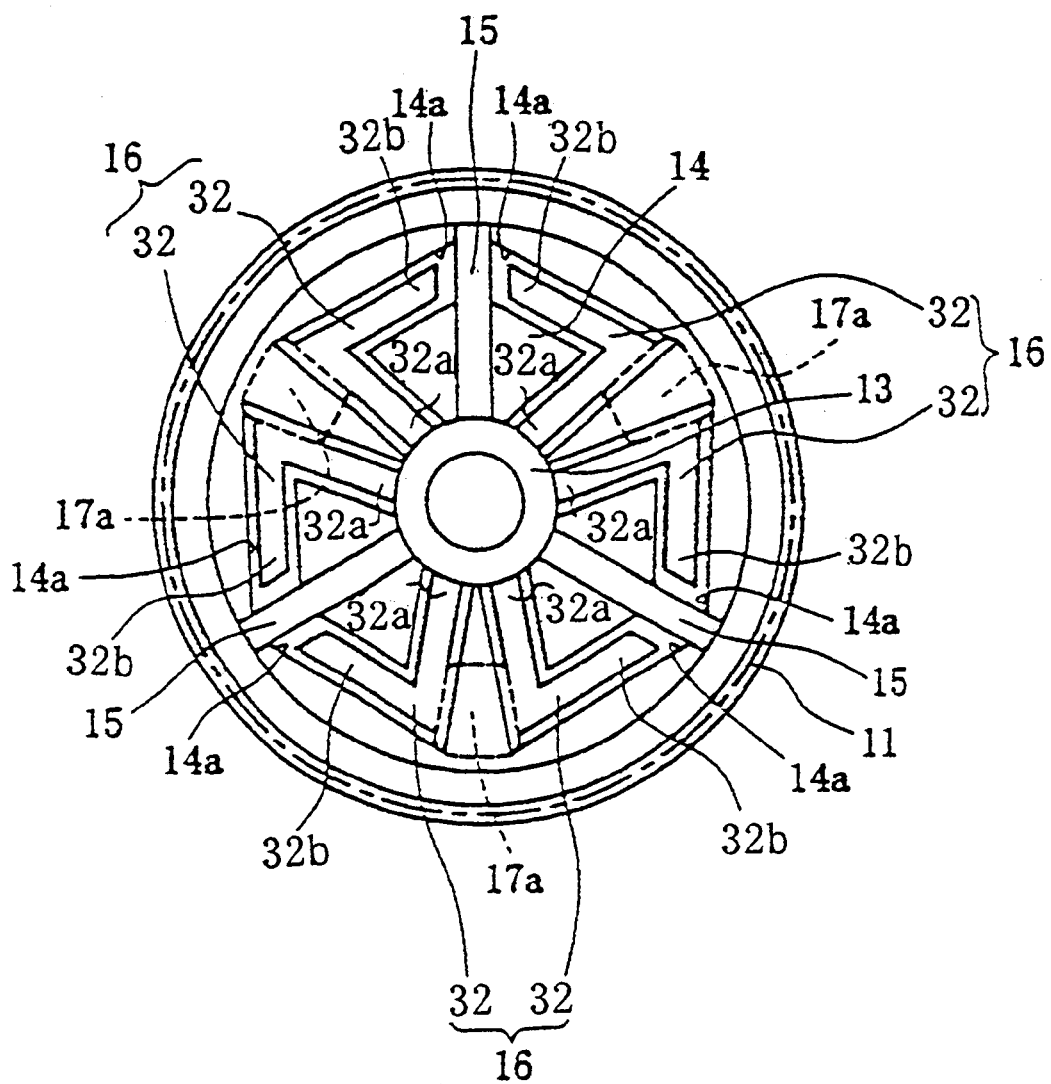
FIG. 14 is a plan view illustrating the shape of an elastic deformable portion formed in the gear according to the present invention.

The shape of the elastic deformable portion 32 in each of the embodiments is not limited to those shown in FIGS. 7 to 13b, and the elastic deformable portion 32 may be formed into a folded shape, as shown in FIG. 14, or a folded and curved shape. In this case, if the folding angle and the degree of curving are determined in consideration of the magnitude of a torque produced by the rotation of the gear, an effect similar to that in each of the embodiments can be provided.

FIGS. 15 to 21 show an embodiment of a gear included in a third group of the present invention.

Figure 15:
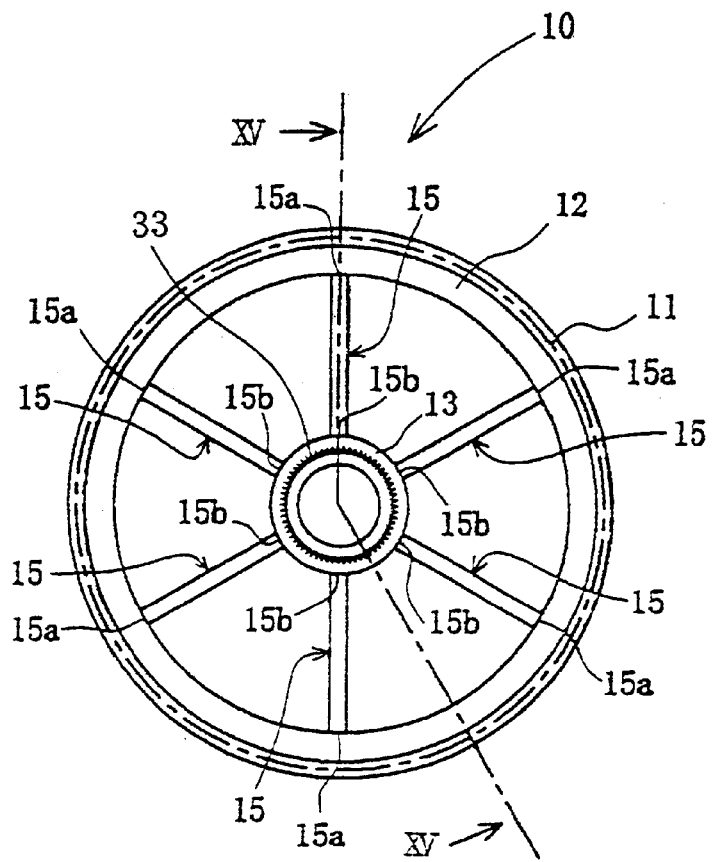
Figure 15:
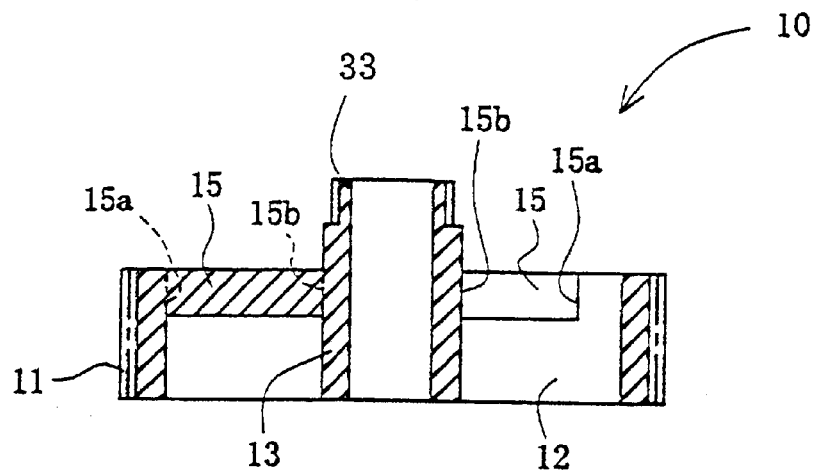

As shown in FIG. 15, the gear of this embodiment includes a cylindrical rim 12 integral at its outer peripheral surface with a plurality of teeth 11, a boss 13 located concentrically with the rim 12, and a plurality of ribs 15 which extend radiately from the boss 13 toward the rim 12 and which is connected to the outer peripheral surface of the boss 13 and the inner peripheral surface of the rim 12 and disposed uniformly. These components are formed integrally. In this respect, the gear of this embodiment is of the substantially same construction as the conventional gear of this type as shown in FIG. 2.

The gear of this embodiment is different largely from the construction of the conventional gear in respect of that a connecting shaft, to which a predetermined power transmitting member can be connected, is formed integrally and coaxially with the boss, and that the ribs are elastically deformable.

More specifically, in this embodiment, the connecting shaft 33 formed as a serration shaft is formed in the gear body 10 coaxially and integrally with the boss 13b, as shown in FIG. 15a, so that any of various power transmitting member (not shown) such as various gears and pulleys can be connected to this gear.

The gear body 10 is formed, so that portions partitioned by the rib 15 between the rim 12 and the boss 13 are hollow, as shown in FIG. 15a, without provision of the web 14 mounted in the conventional gear shown in FIG. 2. Therefore, when the ribs 15 receive a predetermined amount of a force upon the start and stoppage of the rotation of the gear through the connections 15a and 15b between the rim 12 and the boss 13b, the ribs 15 are easily deformed elastically.

The gear of this embodiment is used with the teeth 11 meshed with a driving gear provided on a power source such as a motor, and is formed, so that the rotational power of the gear body 10 rotated by a power from the power source can be transmitted to a power transmitting member connected to the connecting shaft 33. The thickness, the width, the length, the shape, the degree of elastic deformation, the direction of elastic deformation and the number of the ribs 15 are determined in consideration of the magnitude of a torque produced by the rotation of the gear, so that when the rotation of the gear with a power transmitting member connected to the connecting shaft 33 is started, the connection 15a to the rim 12 and the connection 15b to the boss 13 are deformed elastically by receiving forces in opposite directions, thereby transmitting the rotational power to the power transmitting member through the connecting shaft 33, and when the rotation of the gear which is being rotated is to be stopped, the connections 15a and 15b are likewise deformed elastically (in this case, however, the directions of forces received by the connections 15a and 15b are reverse from those when the rotation is started, respectively), whereby the rotation of the power transmitting member can be stopped through the connecting shaft 33.

The gear of this embodiment is constructed in the above manner. Therefore, when the rotation of the gear body 10 with the power transmitting member connected to the connecting shaft 33 is started, the ribs 15 receive a force in the rotational direction from the connection 15a to the rim 12 to transmit the rotational power to the boss 13 through the connection 15b to the boss 13. At this time, an excessive load is applied to the ribs 15 in the direction of rotation of the gear through the rim 12, but is absorbed by elastic deformation of the ribs 15.

On the other hand, when the rotation of the gear body 10 which is being rotated is stopped, the ribs 15 receive a force in a direction opposite from the rotational direction from the connection 15a to the rim 12 to transmit the force to the boss 13 through the connection 15b to the boss 13, thereby stopping the rotation of the power transmitting member through the connecting shaft 33. At this time, an excessive load is applied to the ribs 15 through the rim 12 in the direction opposite from the direction of rotation of the gear, but is absorbed by elastic deformation of the ribs 15.

The force applied to the ribs 15, when the rotation is stopped, is larger than that when the gear body is rotated.

With the gear of such embodiment, the excessive shock generated with the rotation of the gear is absorbed by the ribs 15. Therefore, a noise produced during rotation of the gear can be reduced more than that produced during rotation of the conventional gear in which the buffering member made of the rubber and the disk-shaped rotational-power transmitting member mounted to the buffering member are mounted separately from the gear body.

More specifically, in a gear such as the above conventional gear, a fitting section 16 is formed by a buffering member, so that the generation of a nose is prevented by absorbing a shock generated at a location where the projection 17a provided on the rotational-power transmitting member 17 is fitted. However, the fitting section 16 and the projection 17a are formed separately from each other and for this reason, the conventional gear has a limit to reduce the noise generated by the contact of the fitting section 16 and the projection 17a with each other. To the contrary, in the gear of this embodiment, the ribs 15 provided to absorb the shock are formed integrally with the gear body 10 and hence, it is possible to inhibit the noise generated by the contact of such two members provided in the conventional gear.

With the gear of this embodiment, the rotational power of the gear can be transmitted to the power transmitting member through the connecting shaft 33 connected coaxiaUy to the boss 13.

Moreover, in the gear of this embodiment, the ribs 15 and the connecting shaft 33 are formed integrally in the gear body 10 and therefore, it is unnecessary to mount a buffering member made of a rubber and a disk-shaped rotational-power transmitting member mounted to the buffering member separately from the gear body 10. Thus, the material cost can be reduced correspondingly, and the gear producing operation can be simplified remarkably.

Therefore, the gear of this embodiment has a performance more excellent than that of the conventional gear having the buffering member made of the rubber and the disk-shaped rotational-power transmitting member mounted thereto, but also the amount of the materials required for production of the gear, the number of parts, the manufacture cost and the operational burden can be reduced remarkably.

Figure 16:
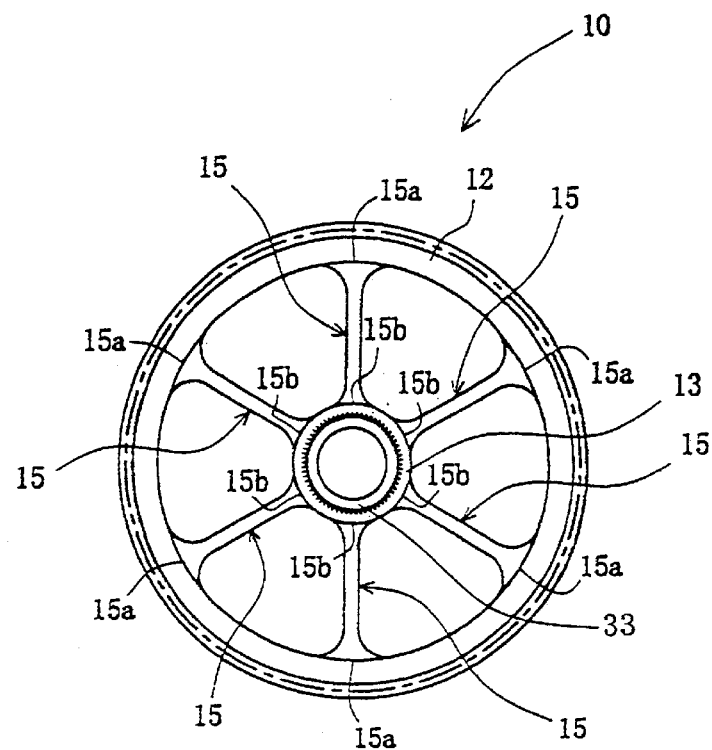
FIG. 16 is a plan view of another embodiment of a gear according to the present invention and included in the third group.

FIG. 16 shows another embodiment of a gear according to the present invention and included in the third group.

In the gear of this embodiment, each of ribs 15 is formed into such a curved shape that the thickness of each of opposite ends thereof is increased toward each of connections 15a and 15b to a rim 12 and a boss 13.

If the plurality of ribs 15 are connected elastically deformably to the rim 12 and the boss 13 as in the embodiment shown in FIG. 15, a force applied to the ribs 15 at the start and stoppage of the rotation of the gear is liable to be concentrated on the connections 15a and 15b to the rim 12 and the boss 13. For this reason, it is necessary for the connections 15a and 15b of the ribs 15 to the rim 12 and the boss 13 to have a strength of such a degree that they are not broken when an excessive load is applied thereto.

With this embodiment, the force applied to the rib 15 is dispersed in a range widened in correspondence an increase in area of connection of each of the ribs 15 to the rim 12 and the boss 13. Therefore, an acceptable amount of a load, which can be applied to the gear, is increased.

The other construction, function and effect are substantially similar to those of the gear of the embodiment shown in FIG. 15.

Figure 17:
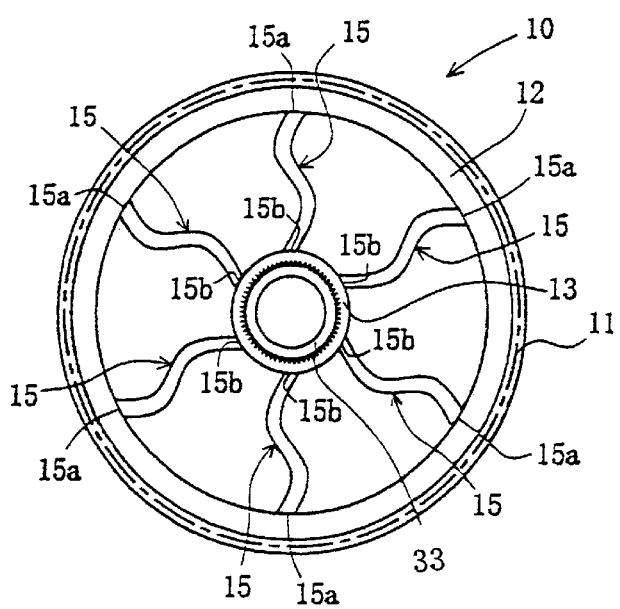
FIG. 17 is a plan view of a further embodiment of a gear according to the present invention and included in the third group.

FIG. 17 shows a further embodiment of a gear according to the present invention and included in the third group.

The gear of this embodiment is of such a construction that ribs 15 formed into an S-shape are disposed radiately and uniformly.

Therefore, with this embodiment, the ribs 15 are liable to be deformed elastically, thereby facilitating the absorption and moderation of an excessive load applied to the ribs by the rotation of the gear and by the stoppage of the rotation.

The other construction, function and effect are substantially similar to those of the gear of the embodiment shown in FIG. 15.

Figure 18:
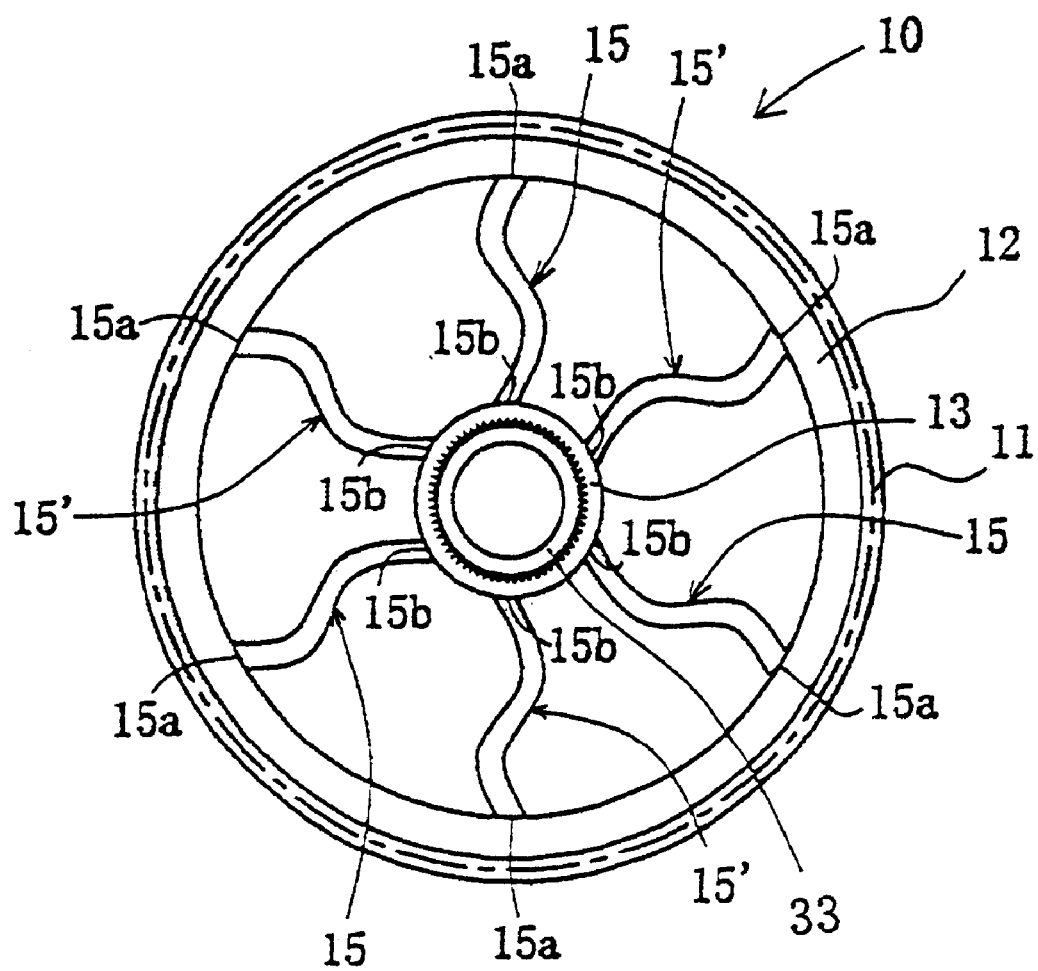
FIG. 18 is a plan view of a yet further embodiment of a gear according to the present invention and included in the third group.

FIG. 18 shows a yet farther embodiment of a gear according to the present invention and included in the third group.

In the gear of this embodiment, ribs 15 formed into an S-shape and ribs 15' formed into an inverted S-shape are disposed alternately.

If the direction of the ribs is uniformized to the S-shape, for example, as in the embodiment shown in FIG. 17, the connections 15a and 15b of each of the ribs 15 are connected to the rim 12 and the boss 13 in an inclined state in one direction. Therefore, the amount of direction of rib 15 elastically deformed by receiving an excessive load produced with the rotation of the gear are varied largely depending on the direction of a force applied to the gear. When the rotation of the gear is started and stopped, the directions of force applied to the gear are opposite from each other. Therefore, if the ribs of a shape curved in one direction are disposed uniformly, an excessive load can be absorbed and moderated to different extents from one each other, when the rotation of the gear is started and stopped.

According to this embodiment, since the ribs 15 and 15' curved in the different directions are disposed uniformly, as shown in FIG. 18, the degree of deformation of all the ribs 15 can be maintained constant without any influence exerted by the direction of the force applied to the gear.

Therefore, according to this embodiment, either when the rotation of the gear is started and when the rotation of the gear is topped, the excessive load produced thereby can be absorbed regularly.

The other construction, function and effect are substantially similar to those of the gear of the embodiment shown in FIG. 15.

Figure 19:
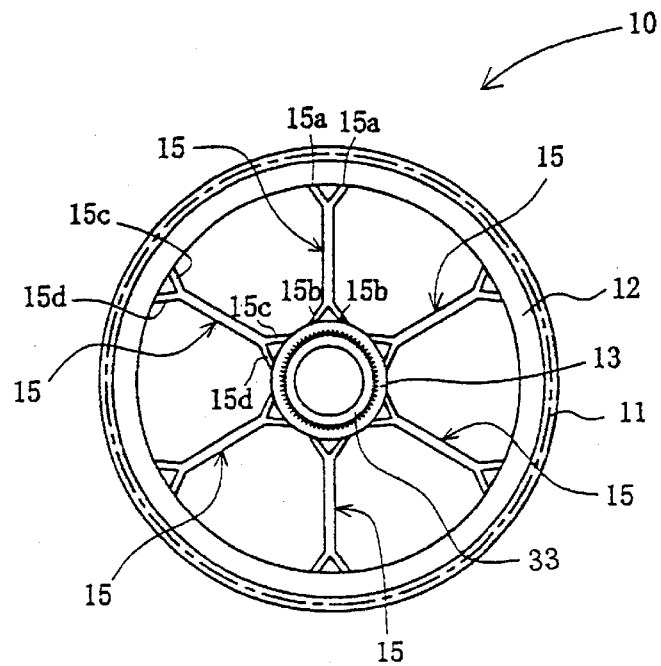
Figure 19:
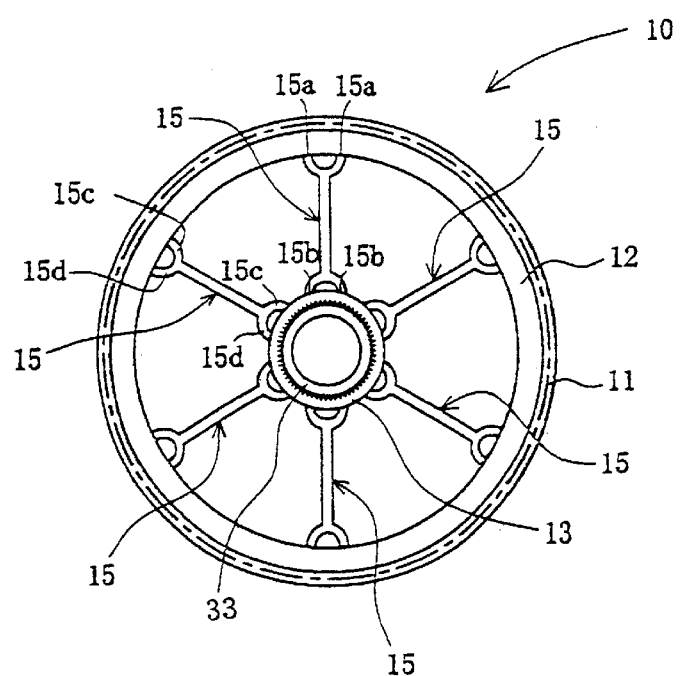

FIG. 19 shows a yet further embodiment of a gear according to the present invention and included in the third group.

In the gear of this embodiment, each of ribs 15 is formed into such a shape that it is bifurcated at opposite ends thereof.

According to this embodiment, a load applied to the rib 15 is dispersed in a range widened in correspondence to an increase in number of points of connection to each of a rim 12 and a boss 13. Therefore, the strength of the connection 15a of the rib 15 is increased and hence, the acceptable amount of a load which can be applied to the gear is increased.

The other construction, function and effect are substantially similar to those of the gear of the embodiment shown in FIG. 15.

Portions 15c and 15d formed by the bifurcation may be of any of a curved shape and a folded shape, as shown in FIGS. 19a and 19b.

Figure 20:
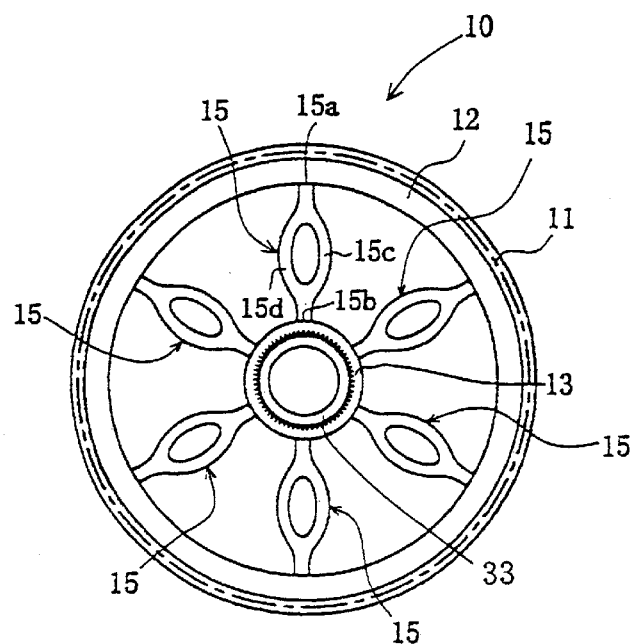
FIG. 20 is a plan view of a yet further embodiment of a gear according to the present invention and included in the third group.

FIG. 20 shows a yet further embodiment of a gear according to the present invention and included in the third group.

In the gear of this embodiment, each of ribs 15 is bifurcated between opposite ends thereof. Portions 15c and 15d formed by the bifurcation are formed into such a curved shape that they are spaced at a largest distance apart from each other at a central portion of the rib 15.

Each of the ribs 15 is pulled in a predetermined direction by application of an excessive load to the rib, when the rotation of the gear is started and stopped. According to this embodiment, however, a shock is moderated by the portions 15c and 15d formed by bifurcation of the rib 15 and hence, the amount of rib deformed is halved, and the rib can withstand a correspondingly strong shock.

The other construction, function and effect are substantially similar to those of the gear of the embodiment shown in FIG. 15.

Figure 21:
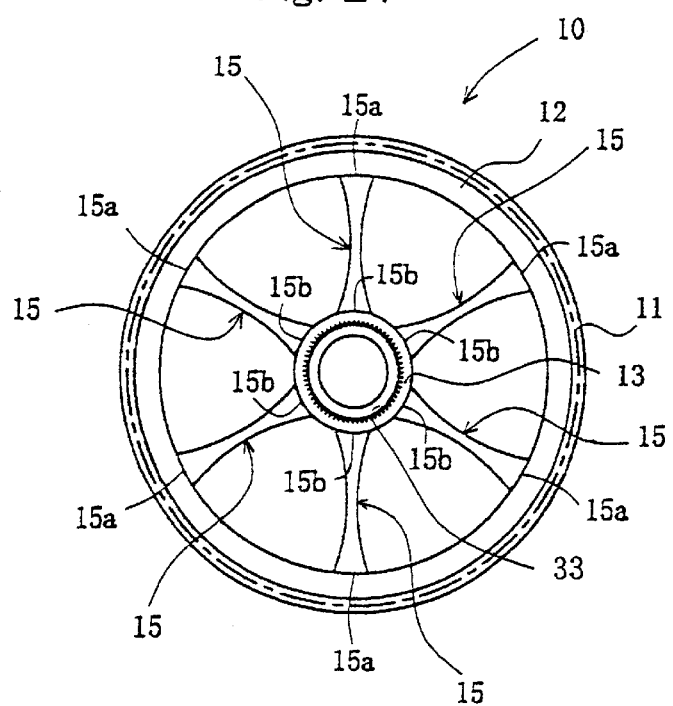
FIG. 21 is a plan view of a yet further embodiment of a gear according to the present invention and included in the third group.

FIG. 21 shows a yet further embodiment of a gear according to the present invention and included in the third group.

In the gear of this embodiment, each of ribs 15 is formed into such a curved shape that the thickness thereof is smallest at a central portion and is increased in directions from the central portion to opposite ends.

According to this embodiment, the force applied to the rib 15 is dispersed in a range widened in correspondence an increase in area of connection of each of the ribs 15 to the rim 12 and the boss 13. Therefore, the strength of the connections 15a and 15b is increased, and an acceptable amount of a load, which can be applied to the gear, is increased.

The other construction, function and effect are substantially similar to those of the gear of the embodiment shown in FIG. 15.

In the gear according to the present invention, each of the ribs may be formed to include a portion having a curved shape, or a portion having a folded shape, or may be formed into a twisted shape.

In addition, each of the ribs may have a thinned portion. In this case, each of the ribs may have a plurality of thinned portions, so that the rib is elastically deformed easily at the thinned portions.

The rib need not have the same width as the width of the teeth of the gear integral with the rim, and may be connected to rim with a difference in level rather than being flush with the rim.

In these cases, if the folding angle, the degree of curving, the thickness of the thinned portion, the number of the folded portions, the point of formation of the thinned portion, the width of the rib and the site of connection of the rib as viewed in a direction of the width of the teeth of the gear are determined in consideration of the magnitude of the torque generated with the rotation of the gear, an effect similar to that in each of the embodiments can be provided.

Further, in each of the embodiments shown in FIGS. 15 to 21, the serration shaft is provided coaxially on the boss 13 as the connecting shaft 33 for connection to the power transmitting member. Alternatively, the connecting shaft 33 may be formed, for example, into a rectangular box-like shape, if a power transmitting member having a shaft which is formed to be able to be fitted into the rectangular box-like portion can be connected to this connecting shaft 33, whereby the rotational power of the gear can be transmitted to the power transmitting member.

For example, if the gear is of a type in which the gear is rotated only in one direction, the elastic deformable portion to which the load is applied at the start of the rotation of the gear and the elastic deformable portion to which the load is applied at the stoppage of the rotation of the gear, may be different in shape from each other to absorb a shock in different degrees.

The type of the teeth formed on the outer peripheral surface of the gear according to the present invention is particularly not limited, and the teeth may be, for example, spur teeth or spiral teeth.

The present invention is applicable to a gear assemble of a multi-stage construction in which a plurality of gears are combined coaxially.

Further, the gear according to the present invention is designed so that the shock force produced at the start of stoppage of the rotation of the gear can be moderated to reduce the noise during rotation of the gear. Therefore, if the gear according to the present invention is used as a gear, the start and stoppage of the rotation of which is conducted intermittently and frequently, the effect of reducing the noise is increased remarkably and hence, the gear according to the present invention is optimal for transmitting a power, for example, for opening and closing an openable/closable device which is opened and closed intermittently, such as a power window and a sunroof for an automobile.

What is claimed is:

1. A gear comprising a gear body which includes a rim integral with a plurality of teeth at an outer peripheral surface thereof, and a boss disposed concentrically inside the rim; and at least one fitting section which is formed from a material for having a low hardness and a low flexural strength as compared with a material for forming the gear body, and which is provided between said rim and said boss, so that said gear with a rotational-power transmitting member fitted into said fitting portion is rotated, whereby the rotational power of said gear body is transmitted to said rotational-power transmitting member, while elastically deforming said fitting section to absorb a predetermined amount of a shock produced with the rotation of said gear body, wherein said gear body and said fitting section are formed integrally with each other by a two-color molding process.

2. A gear according to claim 1, wherein said fitting section is formed to fill a space which is comprised of a recess defined by at least said rim, said boss and a web formed between said boss and said rim, and a bore portion communicating with the bottom surface of said recess and defined into such a shape that the sectional area at a predetermined location spaced apart from the bottom surface of said bore portion is larger than the sectional area at a location of connection to the bottom surface of said recess.

3. A gear according to claim 2, wherein said bore portion comprises a groove defined in said web on the opposite side from the side in which said recess is defined, and a through-bore having a sectional area smaller than the sectional area of the bottom surface, of any of said recess and said groove.

4. A gear according to claim 2, wherein said bore portion comprises a through-bore or a groove which communicates with said recess and which is defined into such a tapered shape that the sectional area is increased gradually in a direction from the bottom surface of said recess toward a deeper portion thereof.

5. A gear according to any of claims 2 to 4, wherein the side face of said recess is formed into such a tapered shape that the sectional area is increased gradually toward the bottom surface.

6. A gear according to any of claims 1 to 4, wherein said gear body is formed from a high-rigid synt hetic resin by an injection molding, and said fitting section is formed from a thermoplastic elastomer by an injection molding.

7. A gear according to claim 5, wherein said gear body is formed form a high-rigid synthetic resin by an injection molding, and said fitting section is formed from a theremoplastic elastomerby an injection molding.

8. A gear comprising a rigid gear body which is formed so that a rotational-power transmitting member is fitted into said gear body to transmit a power through the rotational-power transmitting member, wherein said gear further includes at least one fitting section into which the rotational-power transmitting member can be fitted, said fitting section being formed integrally on said gear body and further being formed in an elastically deformable shape to absorb a predetermined amount of shock produced with the rotation of said gear body.

9. A gear according to claim 8, wherein said gear body comprises a rim integral with a plurality of teeth at its outer peripheral surface, a boss disposed concentrically inside the rim, and a plurality of ribs disposed radiately between said rim and said boss, and a plurality of said fitting sections are provided in areas partitioned between said boss and said rim by said ribs for fitting the disk-shaped rotational-power transmitting member into said gear body, each of said fitting sections being formed integrally in said gear body into such a shape that it can be elastically deformed along a web formed between said rim and said boss.

10. A gear according to claim 9, wherein said fitting section is connected at least at one end thereof to either one of said boss, said rim, said ribs and said web, at least most of that face of the fitting section, which is turned toward said web, being comprised of one or more elastic deformable portion which is formed so that it is not connected to said web.

11. A gear according to claim 10, wherein each of the fitting sections is formed, so that a projection provided on the rotational-power transmitting member is clamped by said two or more elastic deformable portions.

12. A gear according to claim 10 or 11, wherein said elastic deformable portion has an area having a folded shape or an area having a curved shape.

* * * * *